(12) United States Patent
Kochar et al.

(10) Patent No.: US 12,158,818 B2
(45) Date of Patent: Dec. 3, 2024

(54) BACKUP MANAGEMENT FOR SYNCHRONIZED DATABASES

(71) Applicant: Rubrik, Inc., Palo Alto, CA (US)

(72) Inventors: Deepti Kochar, San Mateo, CA (US); Ganesh Karuppur Rajagopalan, Los Gatos, CA (US); Pandian Raju, Sunnyvale, CA (US); Yanzhe Wang, Santa Clara, CA (US)

(73) Assignee: Rubrik, Inc., Palo Alto, CA (US)

( * ) Notice: Subject to any disclaimer, the term of this patent is extended or adjusted under 35 U.S.C. 154(b) by 65 days.

(21) Appl. No.: 17/751,311

(22) Filed: May 23, 2022

(65) Prior Publication Data
US 2023/0376386 A1   Nov. 23, 2023

(51) Int. Cl.
*G06F 11/14* (2006.01)
*G06F 16/27* (2019.01)

(52) U.S. Cl.
CPC .......... *G06F 11/1464* (2013.01); *G06F 16/27* (2019.01); *G06F 2201/84* (2013.01)

(58) Field of Classification Search
CPC ... G06F 11/1461; G06F 16/27; G06F 2201/84
USPC ....................................................... 707/639
See application file for complete search history.

(56) References Cited

U.S. PATENT DOCUMENTS

| | | | |
|---|---|---|---|
| 2007/0168704 A1* | 7/2007 | Connolly ............. | G06F 11/2025 714/E11.073 |
| 2007/0198700 A1* | 8/2007 | Vivian ................ | G06F 11/2097 709/224 |
| 2008/0086516 A1* | 4/2008 | Claborn .............. | G06F 11/2094 |
| 2008/0235291 A1* | 9/2008 | Lahiri ................. | G06F 11/2035 |
| 2023/0034426 A1* | 2/2023 | Kati .................. | G06F 16/24573 |

* cited by examiner

*Primary Examiner* — Robert W Beausoliel, Jr.
*Assistant Examiner* — Lauren Zannah Ganger
(74) *Attorney, Agent, or Firm* — Holland & Hart LLP

(57) ABSTRACT

A data backup server may obtain, for a set of databases that includes a primary database and a set of standby databases configured to be synchronized with the primary database. The data backup server may identify, based on the role information, a data backup group that includes a subset of the databases. In some examples, the first database may be included in the data backup group based on being a primary database, the one or more second databases may be included in the data backup group based at least in part on being standby databases of a first type, and the one or more third databases may be excluded from the data backup group based on being standby databases of a second type. The data backup server may then perform a backup procedure based on generating a snapshot of a database within the data backup group.

18 Claims, 10 Drawing Sheets

BACKUP MANAGEMENT FOR SYNCHRONIZED DATABASES

FIELD OF TECHNOLOGY

The present disclosure relates generally to database systems and data processing, and more specifically to backup management for synchronized databases.

BACKGROUND

A data management system (DMS) may be employed to manage data associated with one or more computing systems. The data may be generated, stored, or otherwise used by the one or more computing systems, examples of which may include servers, databases, virtual machines, cloud computing systems, file systems (e.g., network-attached storage (NAS) systems), or other data storage or processing systems. The DMS may provide data backup, data recovery, data classification, or other types of data management services for data of the one or more computing systems. Improved data management may offer improved performance with respect to reliability, speed, efficiency, scalability, security, or ease-of-use, among other possible aspects of performance.

DETAILED DESCRIPTION

Figure 1:
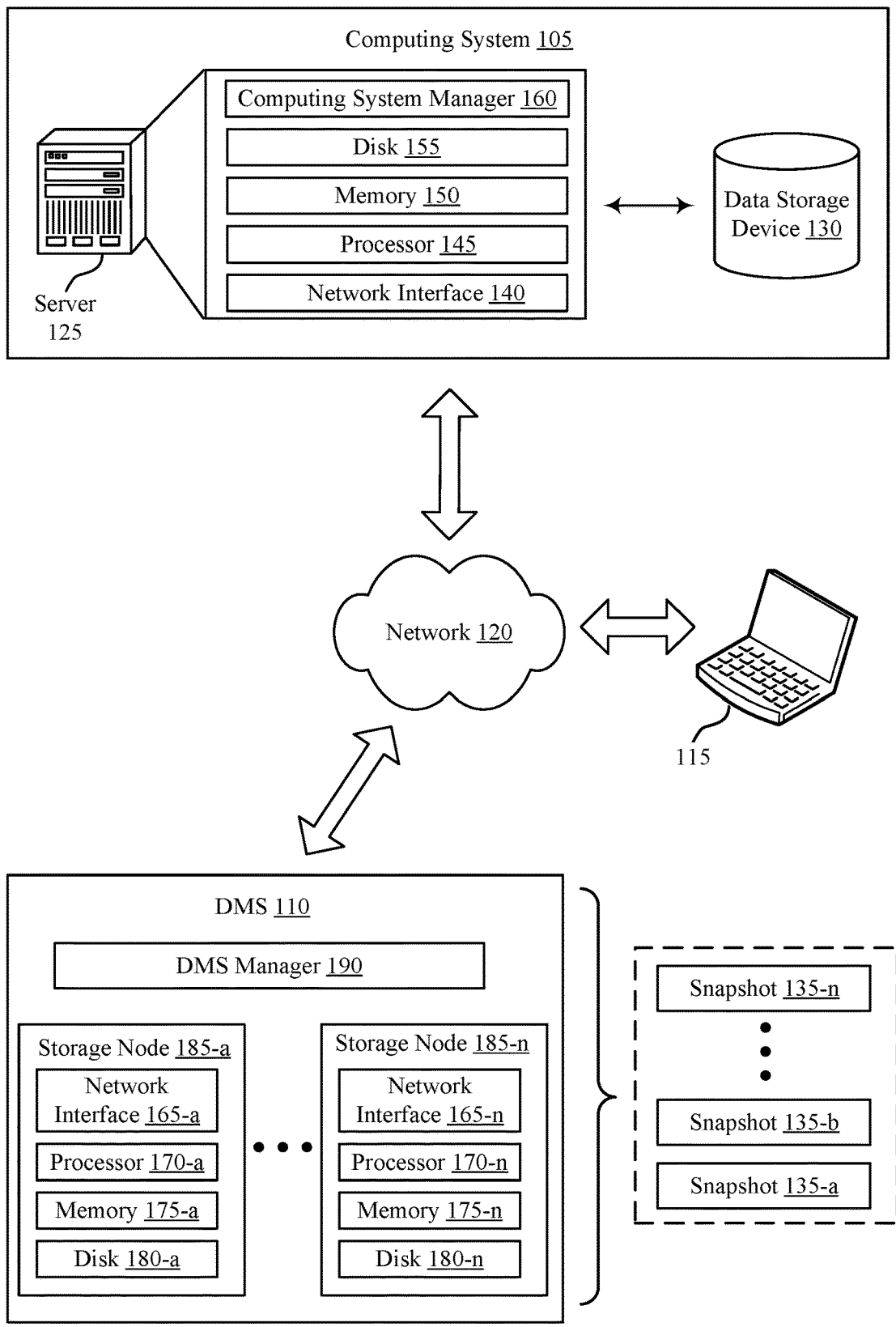
FIG. 1 illustrates an example of a computing environment that supports backup management for synchronized databases in accordance with aspects of the present disclosure.

A data synchronization group (e.g., a data guard group) may include a primary database and a set of standby databases, where the standby databases are configured to be synchronized with the primary database (e.g., based on receiving transaction log information associated with the primary database). The databases within the data synchronization group may be geographically distributed. A database assuming a role of a primary database may be based on role information assigned to that particular database. In some instances, a particular database that acts as the primary database may vary over time (e.g., due to failover or switchover events). That is, a database that is at one time a standby database may at some later time become the primary database, and vice versa. Multiple types of standby databases may exist (e.g., physical standby databases and logical standby databases) in a data synchronization group. In some examples, a server may back up one or more databases by generating snapshots. However, snapshots obtained from standby databases of a first type (e.g., physical standby databases) and the primary database may be interchangeable for recovery purposes (e.g., the primary database may be recoverable based on a snapshot of a physical standby database, or a physical standby database may be recoverable based on a snapshot of the primary database), while snapshots obtained from standby databases of another type (e.g., logical standby databases, standby databases of other types that are not physical standby databases) may not be interchangeable for recovery purposes with snapshots obtained from the primary database.

One or more aspects of the present disclosure provide for automatically identifying, for a data synchronization group, a data backup group that includes the primary database and the first type of standby databases of the data synchronization group and that excludes a second type of standby databases of the data synchronization group. Herein, a first type of standby database may refer to any standby database that is to be included in the data backup group—e.g., based on a snapshot for a standby database of the first type being interchangeable for recovery purposes with snapshots obtained from a primary database—and a second type of standby database may refer to any standby database that is to be excluded from the data backup group. For example, a physical standby database may be an example of a first type of database, while other types of standby databases (e.g., logical standby databases, snapshot standby databases, far sync standby databases) may be (e.g., collectively or individually) a second type of standby database.

In some examples, a server (e.g., backup management system) may query one or more database hosts for a set of databases of a data synchronization group. The backup management system may identify a set of databases that including a primary database and a plurality of standby databases configured to be synchronized with the primary database. The backup management system may obtain a role information for the set of databases. The role information may indicate a first database as the primary database, one or more second databases as standby databases of the first type, and one or more third databases as standby databases of the second type. The backup management system may monitor the roles of the databases within the data synchronization group (e.g., through periodic or other repeated querying) and update the membership of the data backup group accordingly. That is, the membership of the data backup group may be updated over time in accordance with updates to the roles of the databases within the data synchronization group.

The backup management system may generate a snapshot for the data synchronization group based on any database within the data backup group and may identify the database used for the snapshot based on a user-configurable policy. For example, a user may configure the backup management system to take snapshots of the primary database (i.e., whichever database is the primary database at the time of the snapshot), or of a physical standby database (e.g., to avoid burdening the host of the primary database), or of a particular database regardless of its current role (e.g., the database with the most powerful host). Such user-configurable policies may account for possible contingencies within the data synchronization group, such as failovers and switchovers. Additional aspects of the present disclosure provide for maintaining logs so that the backup management system may use incremental snapshots without sacrificing recover-ability even when a contingency within the data synchronization group causes a change in which database is used for snapshots, to maintaining metadata indicating the particular database from which a given snapshot was taken, and improving the efficiency with which transaction logs may be archived for the data synchronization group (e.g., by deleting the logs from all members once a snapshot is taken for the group.

Aspects of the disclosure are initially described in the context of an environment supporting an on-demand database service. Aspects of the disclosure are further illustrated by and described with reference to a system diagram and a process flow. Aspects of the disclosure are further illustrated by and described with reference to apparatus diagrams, system diagrams, and flowcharts that relate to backup management for synchronized databases.

FIG. 1 illustrates an example of a computing environment 100 for cloud computing that supports backup management for synchronized databases in accordance with various aspects of the present disclosure. The computing environment 100 may include a computing system 105, a data management system (DMS) 110, and one or more computing devices 115, which may be in communication with one another via a network 120. The computing system 105 may generate, store, process, modify, or otherwise use associated data, and the DMS 110 may provide one or more data management services for the computing system 105. For example, the DMS 110 may provide a data backup service, a data recovery service, a data classification service, a data transfer or replication service, one or more other data management services, or any combination thereof for data associated with the computing system 105.

The network 120 may allow the one or more computing devices 115, the computing system 105, and the DMS 110 to communicate (e.g., exchange information) with one another. The network 120 may include aspects of one or more wired networks (e.g., the Internet), one or more wireless networks (e.g., cellular networks), or any combination thereof. The network 120 may include aspects of one or more public networks or private networks, as well as secured or unsecured networks, or any combination thereof. The network 120 also may include any quantity of communications links and any quantity of hubs, bridges, routers, switches, ports or other physical or logical network components.

A computing device 115 may be used to input information to or receive information from the computing system 105, the DMS 110, or both. For example, a user of the computing device 115 may provide user inputs via the computing device 115, which may result in commands, data, or any combination thereof being communicated via the network 120 to the computing system 105, the DMS 110, or both. Additionally or alternatively, a computing device 115 may output (e.g., display) data or other information received from the computing system 105, the DMS 110, or both. A user of a computing device 115 may, for example, use the computing device 115 to interact with one or more user interfaces (e.g., graphical user interfaces (GUIs)) to operate or otherwise interact with the computing system 105, the DMS 110, or both. Though one computing device 115 is shown in FIG. 1, it is to be understood that the computing environment 100 may include any quantity of computing devices 115.

A computing device 115 may be a stationary device (e.g., a desktop computer or access point) or a mobile device (e.g., a laptop computer, tablet computer, or cellular phone). In some examples, a computing device 115 may be a commercial computing device, such as a server or collection of servers. And in some examples, a computing device 115 may be a virtual device (e.g., a virtual machine). Though shown as a separate device in the example computing environment of FIG. 1, it is to be understood that in some cases a computing device 115 may be included in (e.g., may be a component of) the computing system 105 or the DMS 110.

The computing system 105 may include one or more servers 125 and may provide (e.g., to the one or more computing devices 115) local or remote access to applications, databases, or files stored within the computing system 105. The computing system 105 may further include one or more data storage devices 130. Though one server 125 and one data storage device 130 are shown in FIG. 1, it is to be understood that the computing system 105 may include any quantity of servers 125 and any quantity of data storage devices 130, which may be in communication with one another and collectively perform one or more functions ascribed herein to the server 125 and data storage device 130.

A data storage device 130 may include one or more hardware storage devices operable to store data, such as one or more hard disk drives (HDDs), magnetic tape drives, solid-state drives (SSDs), storage area network (SAN) storage devices, or network-attached storage (NAS) devices. In some cases, a data storage device 130 may comprise a tiered data storage infrastructure (or a portion of a tiered data storage infrastructure). A tiered data storage infrastructure may allow for the movement of data across different tiers of the data storage infrastructure between higher-cost, higher-performance storage devices (e.g., SSDs and HDDs) and relatively lower-cost, lower-performance storage devices (e.g., magnetic tape drives). In some examples, a data storage device 130 may be a database (e.g., a relational database), and a server 125 may host (e.g., provide a database management system for) the database.

A server 125 may allow a client (e.g., a computing device 115) to download information or files (e.g., executable, text, application, audio, image, or video files) from the computing system 105, to upload such information or files to the computing system 105, or to perform a search query related to particular information stored by the computing system 105. In some examples, a server 125 may act as an application server or a file server. In general, a server 125 may refer to one or more hardware devices that act as the host in a client-server relationship or a software process that shares a resource with or performs work for one or more clients.

A server 125 may include a network interface 140, processor 145, memory 150, disk 155, and computing system manager 160. The network interface 140 may enable the server 125 to connect to and exchange information via the network 120 (e.g., using one or more network protocols). The network interface 140 may include one or more wireless network interfaces, one or more wired network interfaces, or any combination thereof. The processor 145 may execute computer-readable instructions stored in the memory 150 in order to cause the server 125 to perform functions ascribed herein to the server 125. The processor 145 may include one or more processing units, such as one or more central processing units (CPUs), one or more graphics processing units (GPUs), or any combination thereof. The memory 150 may comprise one or more types of memory (e.g., random access memory (RAM), static random access memory (SRAM), dynamic random access memory (DRAM), read-only memory ((ROM), electrically erasable programmable read-only memory (EEPROM), Flash, etc.). Disk 155 may include one or more HDDs, one or more SSDs, or any combination thereof. Memory 150 and disk 155 may comprise hardware storage devices. The computing system manager 160 may manage the computing system 105 or aspects thereof (e.g., based on instructions stored in the memory 150 and executed by the processor 145) to perform functions ascribed herein to the computing system 105. In some examples, the network interface 140, processor 145, memory 150, and disk 155 may be included in a hardware layer of a server 125, and the computing system manager 160 may be included in a software layer of the server 125. In some cases, the computing system manager 160 may be distributed across (e.g., implemented by) multiple servers 125 within the computing system 105.

In some examples, the computing system 105 or aspects thereof may be implemented within one or more cloud computing environments, which may alternatively be referred to as cloud environments. Cloud computing may refer to Internet-based computing, wherein shared resources, software, and/or information may be provided to one or more computing devices on-demand via the Internet. A cloud environment may be provided by a cloud platform, where the cloud platform may include physical hardware components (e.g., servers) and software components (e.g., operating system) that implement the cloud environment. A cloud environment may implement the computing system 105 or aspects thereof through Software-as-a-Service (SaaS) or Infrastructure-as-a-Service (IaaS) services provided by the cloud environment. SaaS may refer to a software distribution model in which applications are hosted by a service provider and made available to one or more client devices over a network (e.g., to one or more computing devices 115 over the network 120). IaaS may refer to a service in which physical computing resources are used to instantiate one or more virtual machines, the resources of which are made available to one or more client devices over a network (e.g., to one or more computing devices 115 over the network 120).

In some examples, the computing system 105 or aspects thereof may implement or be implemented by one or more virtual machines. The one or more virtual machines may run various applications, such as a database server, an application server, or a web server. For example, a server 125 may be used to host (e.g., create, manage) one or more virtual machines, and the computing system manager 160 may manage a virtualized infrastructure within the computing system 105 and perform management operations associated with the virtualized infrastructure. The computing system manager 160 may manage the provisioning of virtual machines running within the virtualized infrastructure and provide an interface to a computing device 115 interacting with the virtualized infrastructure. For example, the computing system manager 160 may be or include a hypervisor and may perform various virtual machine-related tasks, such as cloning virtual machines, creating new virtual machines, monitoring the state of virtual machines, moving virtual machines between physical hosts for load balancing purposes, and facilitating backups of virtual machines. In some examples, the virtual machines, the hypervisor, or both, may virtualize and make available resources of the disk 155, the memory, the processor 145, the network interface 140, the data storage device 130, or any combination thereof in support of running the various applications. Storage resources (e.g., the disk 155, the memory 150, or the data storage device 130) that are virtualized may be accessed by applications as a virtual disk.

The DMS 110 may provide one or more data management services for data associated with the computing system 105 and may include DMS manager 190 and any quantity of storage nodes 185. The DMS manager 190 may manage operation of the DMS 110, including the storage nodes 185. Though illustrated as a separate entity within the DMS 110, the DMS manager 190 may in some cases be implemented (e.g., as a software application) by one or more of the storage nodes 185. In some examples, the storage nodes 185 may be included in a hardware layer of the DMS 110, and the DMS manager 190 may be included in a software layer of the DMS 110. In the example illustrated in FIG. 1, the DMS 110 is separate from the computing system 105 but in communication with the computing system 105 via the network 120. It is to be understood, however, that in some examples at least some aspects of the DMS 110 may be located within computing system 105. For example, one or more servers 125, one or more data storage devices 130, and at least some aspects of the DMS 110 may be implemented within the same cloud environment or within the same data center.

Storage nodes 185 of the DMS 110 may include respective network interfaces 165, processors 170, memories 175, and disks 180. The network interfaces 165 may enable the storage nodes 185 to connect to one another, to the network 120, or both. A network interface 165 may include one or more wireless network interfaces, one or more wired network interfaces, or any combination thereof. The processor 170 of a storage node 185 may execute computer-readable instructions stored in the memory 175 of the storage node 185 in order to cause the storage node 185 to perform processes described herein as performed by the storage node 185. A processor 170 may include one or more processing units, such as one or more CPUs, one or more GPUs, or any combination thereof. The memory 150 may comprise one or more types of memory (e.g., RAM, SRAM, DRAM, ROM, EEPROM, Flash, etc.). A disk 180 may include one or more HDDs, one or more SDDs, or any combination thereof. Memories 175 and disks 180 may comprise hardware storage devices. Collectively, the storage nodes 185 may in some cases be referred to as a storage cluster or as a cluster of storage nodes 185.

The DMS 110 may provide a backup and recovery service for the computing system 105. For example, the DMS 110 may manage the extraction and storage of snapshots 135 associated with different point-in-time versions of one or more target computing objects within the computing system 105. A snapshot 135 of a computing object (e.g., a virtual machine, a database, a filesystem, a virtual disk, a virtual desktop, or other type of computing system or storage system) may be a file (or set of files) that represents a state of the computing object (e.g., the data thereof) as of a particular point in time. A snapshot 135 may also be used to restore (e.g., recover) the corresponding computing object as of the particular point in time corresponding to the snapshot 135. A computing object of which a snapshot 135 may be generated may be referred to as snappable. Snapshots 135 may be generated at different times (e.g., periodically or on some other scheduled or configured basis) in order to represent the state of the computing system 105 or aspects thereof as of those different times. In some examples, a snapshot 135 may include metadata that defines a state of the computing object as of a particular point in time. For example, a snapshot 135 may include metadata associated with (e.g., that defines a state of) some or all data blocks included in (e.g., stored by or otherwise included in) the computing object. Snapshots 135 (e.g., collectively) may capture changes in the data blocks over time. Snapshots 135 generated for the target computing objects within the computing system 105 may be stored in one or more storage locations (e.g., the disk 155, memory 150, the data storage device 130) of the computing system 105, in the alternative or in addition to being stored within the DMS 110, as described herein.

To obtain a snapshot 135 of a target computing object associated with the computing system 105 (e.g., of the entirety of the computing system 105 or some portion thereof, such as one or more databases, virtual machines, or filesystems within the computing system 105), the DMS manager 190 may transmit a snapshot request to the computing system manager 160. In response to the snapshot request, the computing system manager 160 may set the target computing object into a frozen state (e.g., a read-only state). Setting the target computing object into a frozen state may allow a point-in-time snapshot 135 of the target computing object to be stored or transferred.

In some examples, the computing system 105 may generate the snapshot 135 based on the frozen state of the computing object. For example, the computing system 105 may execute an agent of the DMS 110 (e.g., the agent may be software installed at and executed by one or more servers 125), and the agent may cause the computing system 105 to generate the snapshot 135 and transfer the snapshot to the DMS 110 in response to the request from the DMS 110. In some examples, the computing system manager 160 may cause the computing system 105 to transfer, to the DMS 110, data that represents the frozen state of the target computing object, and the DMS 110 may generate a snapshot 135 of the target computing object based on the corresponding data received from the computing system 105.

Once the DMS 110 receives, generates, or otherwise obtains a snapshot 135, the DMS 110 may store the snapshot 135 at one or more of the storage nodes 185. The DMS 110 may store a snapshot 135 at multiple storage nodes 185, for example, for improved reliability. Additionally or alternatively, snapshots 135 may be stored in some other location connected with the network 120. For example, the DMS 110 may store more recent snapshots 135 at the storage nodes 185, and the DMS 110 may transfer less recent snapshots 135 via the network 120 to a cloud environment (which may include or be separate from the computing system 105) for storage at the cloud environment, a magnetic tape storage device, or another storage system separate from the DMS 110.

Updates made to a target computing object that has been set into a frozen state may be written by the computing system 105 to a separate file (e.g., an update file) or other entity within the computing system 105 while the target computing object is in the frozen state. After the snapshot 135 (or associated data) of the target computing object has been transferred to the DMS 110, the computing system manager 160 may release the target computing object from the frozen state, and any corresponding updates written to the separate file or other entity may be merged into the target computing object.

In response to a restore command (e.g., from a computing device 115 or the computing system 105), the DMS 110 may restore a target version (e.g., corresponding to a particular point in time) of a computing object based on a corresponding snapshot 135 of the computing object. In some examples, the corresponding snapshot 135 may be used to restore the target version based on data of the computing object as stored at the computing system 105 (e.g., based on information included in the corresponding snapshot 135 and other information stored at the computing system 105, the computing object may be restored to its state as of the particular point in time). Additionally or alternatively, the corresponding snapshot 135 may be used to restore the data of the target version based on data of the computing object as included in one or more backup copies of the computing object (e.g., file-level backup copies or image-level backup copies). Such backup copies of the computing object may be generated in conjunction with or according to a separate schedule than the snapshots 135. For example, the target version of the computing object may be restored based on the information in a snapshot 135 and based on information included in a backup copy of the target object generated prior to the time corresponding to the target version. Backup copies of the computing object may be stored at the DMS 110 (e.g., in the storage nodes 185) or in some other location connected with the network 120 (e.g., in a cloud environment, which in some cases may be separate from the computing system 105).

In some examples, the DMS 110 may restore the target version of the computing object and transfer the data of the restored computing object to the computing system 105. And in some examples, the DMS 110 may transfer one or more snapshots 135 to the computing system 105, and restoration of the target version of the computing object may occur at the computing system 105 (e.g., as managed by an agent of the DMS 110, where the agent may be installed and operate at the computing system 105).

In response to a mount command (e.g., from a computing device 115 or the computing system 105), the DMS 110 may instantiate data associated with a point-in-time version of a computing object based on a snapshot 135 corresponding to the computing object (e.g., along with data included in a backup copy of the computing object) and the point-in-time. The DMS 110 may then allow the computing system 105 to read or modify the instantiated data (e.g., without transferring the instantiated data to the computing system). In some examples, the DMS 110 may instantiate (e.g., virtually mount) some or all of the data associated with the point-in-time version of the computing object for access by the computing system 105, the DMS 110, or the computing device 115.

In some examples, the DMS 110 may store different types of snapshots, including for the same computing object. For example, the DMS 110 may store both base snapshots 135 and incremental snapshots 135. A base snapshot 135 may represent the entirety of the state of the corresponding computing object as of a point in time corresponding to the base snapshot 135. An incremental snapshot 135 may represent the changes to the state—which may be referred to as the delta—of the corresponding computing object that have occurred between an earlier or later point in time corresponding to another snapshot 135 (e.g., another base snapshot 135 or incremental snapshot 135) of the computing object and the incremental snapshot 135. In some cases, some incremental snapshots 135 may be forward-incremental snapshots 135 and other incremental snapshots 135 may be reverse-incremental snapshots 135. To generate a full snapshot 135 of a computing object using a forward-incremental snapshot 135, the information of the forward-incremental snapshot 135 may be combined with (e.g., applied to) the information of an earlier base snapshot 135 of the computing object along with the information of any intervening forward-incremental snapshots 135, where the earlier base snapshot 135 may include a base snapshot 135 and one or more reverse-incremental or forward-incremental snapshots 135. To generate a full snapshot 135 of a computing object using a reverse-incremental snapshot 135, the information of the reverse-incremental snapshot 135 may be combined with (e.g., applied to) the information of a later base snapshot 135 of the computing object along with the information of any intervening reverse-incremental snapshots 135.

In some examples, the DMS 110 may provide a data classification service, a malware detection service, a data transfer or replication service, backup verification service, or any combination thereof, among other possible data management services for data associated with the computing system 105. For example, the DMS 110 may analyze data included in one or more computing objects of the computing system 105, metadata for one or more computing objects of the computing system 105, or any combination thereof, and based on such analysis, the DMS 110 may identify locations within the computing system 105 that include data of one or more target data types (e.g., sensitive data, such as data subject to privacy regulations or otherwise of particular interest) and output related information (e.g., for display to a user via a computing device 115). Additionally or alternatively, the DMS 110 may detect whether aspects of the computing system 105 have been impacted by malware (e.g., ransomware). Additionally or alternatively, the DMS 110 may relocate data or create copies of data based on using one or more snapshots 135 to restore the associated computing object within its original location or at a new location (e.g., a new location within a different computing system 105). Additionally or alternatively, the DMS 110 may analyze backup data to ensure that the underlying data (e.g., user data or metadata) has not been corrupted. The DMS 110 may perform such data classification, malware detection, data transfer or replication, or backup verification, for example, based on data included in snapshots 135 or backup copies of the computing system 105, rather than live contents of the computing system 105, which may beneficially avoid adversely.

According to one or more aspects, the computing system 105 may support a single primary database and multiple standby databases. The standby databases may include two or more types of standby databases, such as, for example, physical standby databases, logical standby databases, snapshot standby databases, far sync standby databases, or any combination thereof. The databases supported by the computing system 105 may be geographically distributed. The members of the set of databases maintained by the computing system 105 may remain in sync using log information. In some examples, the DMS 110 may provide for a backup service for the databases maintained or otherwise supported by the computing system 105. However, the backup architecture of such databases may be predefined by the computing system 105 and a customers may not be able to synchronize backup from any of the member databases based on role or location.

Techniques depicted herein provide for a method for backup management for synchronized databases. In some cases, a set of databases managed by the computing system 105 may include a primary database instance and one or more standby instances which are kept in sync with the primary database instance. The DMS 110 may create a data backup group that includes a subset of the databases managed by the computing system 105. For instance, the DMS 110 may identify that a primary and standby instance refer to the same database. Accordingly, when discovering databases for backup, the DMS 110 may discover a primary and standby instance as belonging to a single snapshot. Additionally or alternatively, the DMS 110 may implement the techniques depicted herein to run backups from both primary and standby databases. In some examples, a customer may have an ability to set a preference for which instance to run the backup on. For instance, a customer may indicate that the DMS 110 perform a backup procedure for a particular database of the set of databases (irrespective of the role for that database).

The DMS 110 may identify a set of databases managed by the computing system 105. The set of databases may include a primary database and a set of standby databases configured to be synchronized with the primary database. The DMS 110 may then obtain, for the set of databases, role information that indicates a first database as the primary database, one or more second databases as standby databases of a first type, and one or more third databases as standby databases of a second type. In some cases, standby databases of any type other than the first type (e.g., standby databases of any type other that the physical standby type) may be considered to be "of the second type." In some examples, the DMS 110 may then identify a data backup group. The DMS 110 may include the first database in the data backup group based on determining that the first database is the primary database. The DMS 110 may include the one or more second databases in the data backup group based on determining that the one or more second databases are standby databases of the first type. In some examples, the DMS 110 may exclude the one or more third databases from the data backup group based on determining that the one or more second databases are standby databases of the second type.

Once a group is created, a customer may choose to take a backup from any of the member databases (of the data backup group) or based on role information for that member database. In the example depicted herein, the customer may choose to take a snapshot from the first database and the one or more second databases. In some cases, a customer can choose to take backups from the database that currently has the primary role or from a particular database irrespective of role. In some instances, the DMS 110 may track role information for the set of databases managed by the computing system 105 to detect the current role of the various database members in real time (as the roles can change during failover or switchover operations).

Figure 2:
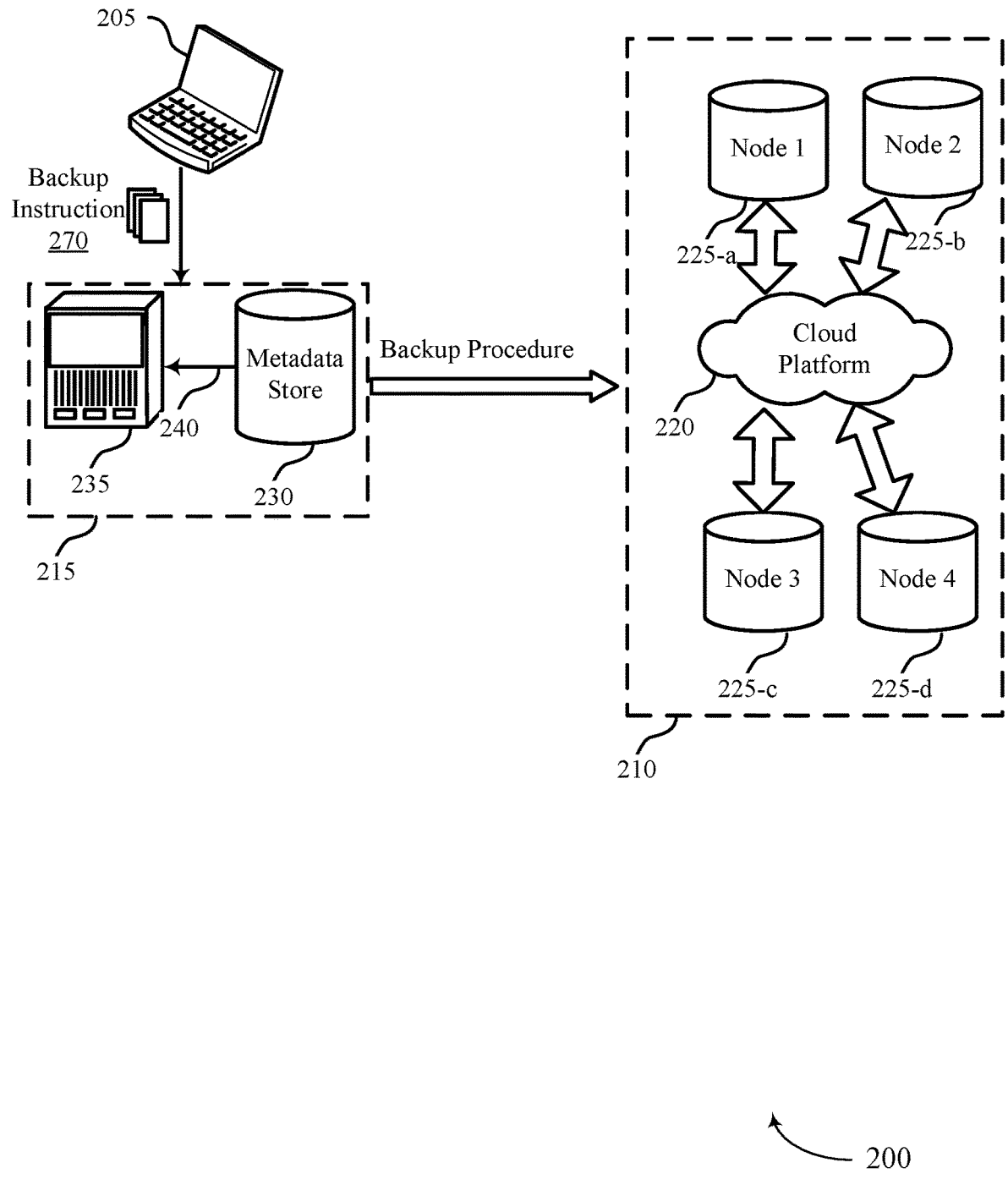
FIG. 2 illustrates an example of a system that supports backup management for synchronized databases in accordance with aspects of the present disclosure.

FIG. 2 illustrates an example of a system 200 that supports backup management for synchronized databases in accordance with aspects of the present disclosure. The system 200 includes a user device 205, a data storage infrastructure 210 and a data manager 215 (e.g., data backup management system). The user device 205 may be an example of a device described with reference to FIG. 1. The user device 205 may also be an example of a cloud client. A cloud client may access data sources using a network connection. The network may implement transfer control protocol and internet protocol (TCP/IP), such as the Internet, or may implement other network protocols. The user device 205 may be an example of a user device, such as a server, a smartphone, or a laptop. In other examples, a user device 205 may be a desktop computer, a tablet, a sensor, or another computing device or system capable of generating, analyzing, transmitting, or receiving communications. In some examples, the user device 205 may be operated by a user that is part of a business, an enterprise, a non-profit, a startup, or any other organization type.

The data storage infrastructure 210 may include a first database 225-a, a second database 225-b, a third database 225-c, and a fourth database 225-d. Although not depicted herein, the data storage infrastructure 210 may include more than four databases 225. The databases 225 may be geographically separated from each other. In some examples, the databases 225 may include primary databases and standby databases. As depicted in the example of FIG. 2, the data storage infrastructure 210 may include a cloud platform 220. The cloud platform 220 may offer storage and computing services to the user device 205. In some cases, the data storage infrastructure 210 may be an example of a storage system. In some examples, the data manager 215 may provide backup and additional data management for the data storage infrastructure. The data manager 215 may serve multiple users with a single instance of software. However, other types of systems may be implemented, including—but not limited to—client-server systems, mobile device systems, and mobile network systems. The data manager 215 may be an example of an integrated data management and storage system. The data manager 215 may include an application server 235. The application server 235 may represent a unified storage system even though numerous storage nodes may be connected together and the number of connected storage nodes may change over time as storage nodes are added to or removed. The data manager 215 may also be an example of a cloud-based storage and an on-demand computing platform.

As depicted herein, the system 200 may support an integrated data management and storage system and may be configured to manage the automated storage, backup, deduplication, replication, recovery, and archival of data within and across physical and virtual computing environments. The system 200 including an integrated data management and storage system may provide a unified primary and secondary storage system with built-in data management that may be used as both a backup storage system and a "live" primary storage system for primary workloads. In some cases, the integrated data management and storage system may manage dynamic versions when performing data storage. In some examples, the system 200 may provide backup of data (e.g., one or more files) using parallelized workloads, where the data may reside on virtual machines and/or real machines (e.g., a hardware server, a laptop, a tablet computer, a smartphone, or a mobile computing device).

According to aspects depicted herein, the system 200 supports backup management for multiple databases 225 (e.g., databases running in a clustered setup). In some examples, the data manager 215 may obtain role information for the set of databases 225. In some examples, the role information may indicate a first database as the primary database, one or more second databases as standby databases of a first type, and one or more third databases as standby databases of a second type. In some examples, backups of datafiles and archived redo logs taken from a physical standby database may be fully interchangeable with primary backups. In other words, the data manager 215 may restore a backup of a physical standby datafile to the primary database, and may restore a backup of a primary datafile to the physical standby database. Thus, the data manager 215 may identify physical standbys and primary databases as being part of a new entity—a data backup group for the purpose of backup and recovery.

In the example of FIG. 2, the data manager 215 may determine that Node 1 is the primary database, Node 2 and Node 3 are physical standby databases and Node 4 is a logical standby database. Based on the role information, the data manager 215 may identify a data backup group for performing a backup procedure. The first database is included in the data backup group based on being the primary database, the one or more second databases are included in the data backup group based at on being standby databases of the first type, and the one or more third databases are excluded from the data backup group based on being standby databases of the second type. Returning to the FIG. 2, the data manager 215 may include Node 1, Node 2 and Node 3 in the data backup group and may exclude Node 4 from the data backup group. The data manager 215 may then perform a backup procedure for the set of databases (all databases manager by the cloud platform 220) based on generating a snapshot of a database within the data backup group. That is, the data manager 215 may perform a backup procedure for Node 1, Node 2, Node 3 and Node 4 by generating a snapshot of a database (either Node 1, Node 2 or Node 3) within the data backup group. In some examples, the data manager 215 may choose a database for generating a snapshot based on one or more rules.

A user may transmit a request including a backup instruction 270. The data storage infrastructure 210 may include or otherwise support change of role information for the databases. In such a setup, utilizing the techniques depicted herein, the system 200 may manage backup for the databases even when their role changes. In some examples, the data manager 215 may identify a change in the role information for the set of databases 225. In some cases, the change in the role information may indicate that a role for at least one database of the one or more third databases has changed from standby database of the second type to standby database of the first type. For example, the data manager 215 may determine that Node 4 has changed from being a logical standby database to being a physical standby database. Based on the change in role information, the data manager 215 may include Node 4 in the data backup group. The updated data backup group in this example may include Node 1, Node 2, Node 3 and Node 4.

In some examples, the system 200 may support performing a backup procedure according to one or more rules (e.g., backup instructions 270). The data manager 215 may identify one or more rules for selecting the database within the data backup group for the backup procedure. The data manager 215 may then select the database for the backup procedure based on the one or more rules, where a snapshot of the database may be generated as part of the backup procedure based on the database being selected. For example, a customer using the user device 205 may indicate that the data manager 215 is to back up a primary database from the data backup group. Thus, if the role information changes over time, the data manager 215 may track such role information to identify the primary database and may generate a snapshot from the newly designated primary database (i.e., the database designated as a primary database after change in role information). Additionally or alternatively, the data manager 215 may receive backup instructions 270 indicating that the data manager 215 is to back up a particular database from the data backup group irrespective of the role information.

According to aspects depicted herein, the data manager 215 may identify a change in the role information for the set of databases. For example, the data manager 215 may identify that Node 2 has been designated the new primary database (e.g., due to failover or switch of databases). In such cases, the data manager 215 may identify a second database (e.g., Node 2) within the data backup group for generating a second snapshot based on one or more rules and the change in the role information for the set of databases. That is, if the rules suggest that the data manager 215 is to generate a snapshot from the primary database, the data manager 215 may select Node 2 to generate a snapshot based on identifying that Node 2 is the new primary database. The data manager 215 may then perform the backup procedure for the set of databases based on generating a second snapshot of the second database (Node 2) within the data backup group.

Additionally or alternatively, one or more rules (e.g., backup instructions 270) may indicate that the backup procedure for the set of databases includes generating a snapshot of the first database (e.g., Node 1) irrespective of the role information for the first database. In such cases, even if the data manager 215 determines that Node 2 has been designated as the new primary database, the data manager 215 may continue to generate a snapshot from Node 1.

The system 200 may support managing the archived logs for the data storage infrastructure 210 after the databases are backed up. The data manager 215 may delete the archived logs on the data storage infrastructure 210 after they are backed up. Since there can be a delay in importing the archived logs from primary to standby databases, the primary databases may include a host log retention configuration. The data manager 215 may thus determine a conclusion of the backup procedure for the set of databases based on generating the snapshot of the database within the data backup group. The data manager 215 may then delete one or more archived logs for the subset of databases included in the data backup group based on determining the conclusion of the backup procedure. The data manager 215 may take log backups from either the primary database or one of the standby databases. In some examples, the data manager 215 may delete the archived logs on the node from which the logs were backed up. The data manager 251 may also automatically manage the archived logs on all the member nodes of the data backup group.

In some examples, the data manager 215 may store a log backup for the database within the data backup group. For example, the data manager 15 may store the log backup in the metadata store 230. The data manager 215 may store one copy of log backups even when data manager 215 switches to back up from another member. Thus, the metadata store 230 maintains one recoverable chain for the data backup group. In some examples, the application server 235 may retrieve 240 the stored logs from the metadata store 230 to identify what time ranges are recoverable by backups. During a failover, the data manager 215 may identify a timestamp associated with the latest snapshot. Based on the stored log information, the data manager 215 may capture an incremental snapshot from the timestamp associated with the latest snapshot (instead of taking a full back up). For instance, the data manager 215 may identify a change in the role information for the set of databases. The data manager 215 may identify a switch over or may identify that a new database has been designated as the primary database. In such cases, the data manager 215 may generate a second snapshot of a second database within the data backup group based on the change in the role information. The second snapshot may include an incremental snapshot based on continuing to store the log backup for the database. The data manager 215 may generate a second log backup for the second database. In such instances, the log backup for the database may be for a first set of transactions and the second log backup for the second database may be for a second set of transactions that are subsequent to the first set of transactions. Thus, the log management implemented by the data manager 215 not only deletes logs on the server from which they were backed up but also from other members of the data backup group.

Figure 3:
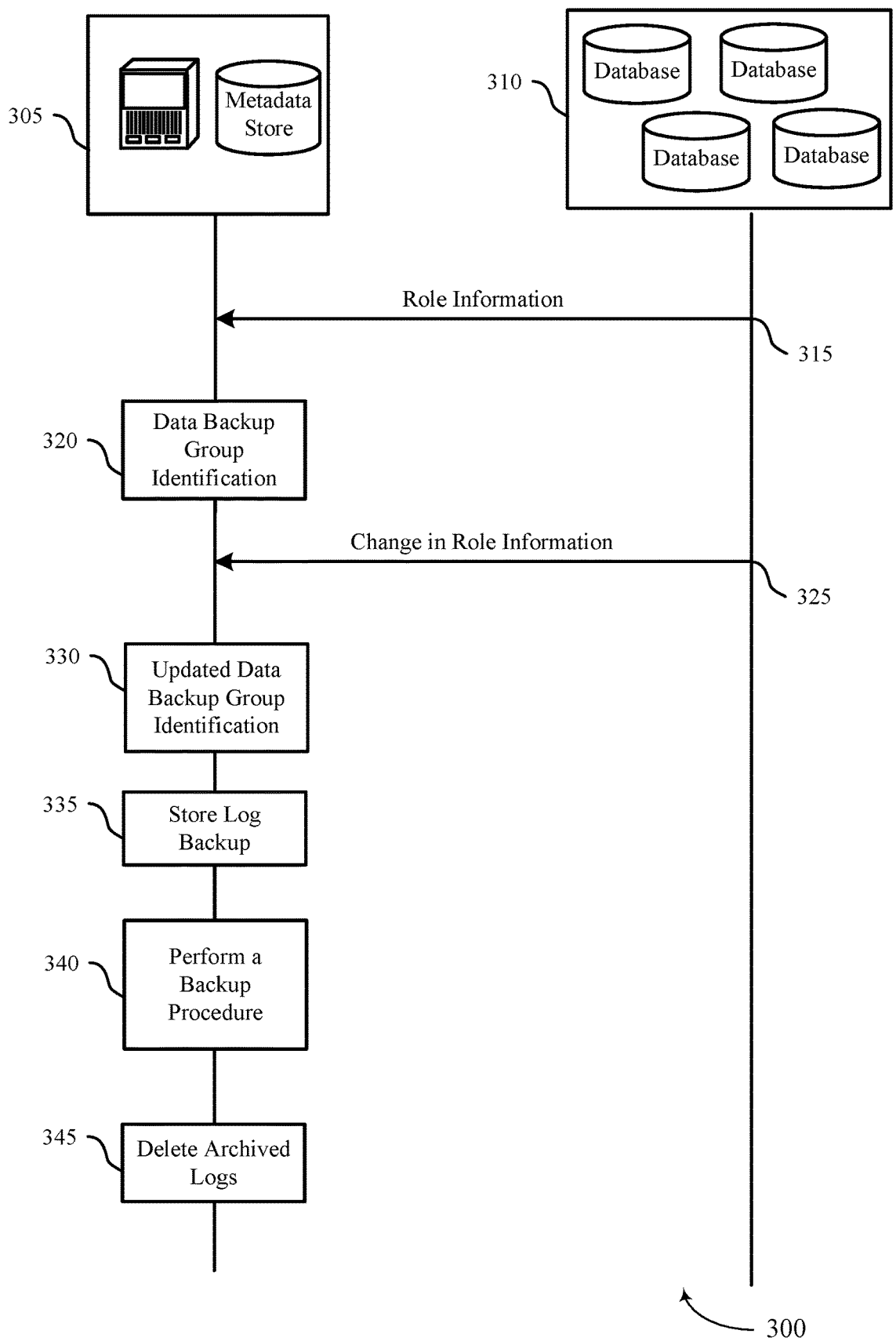
FIG. 3 illustrates an example of a process flow that supports backup management for synchronized databases in accordance with aspects of the present disclosure.

FIG. 3 illustrates an example of a process flow 300 that supports backup management for synchronized databases in accordance with aspects of the present disclosure. The process flow 300 includes a data management platform 305 and a data storage infrastructure 310. The data management platform 305 may include an application server and a metadata storage as described with respect to FIG. 2. The data storage infrastructure 310 may include multiple databases as described with respect to FIG. 2. Although a single entity is depicted as data management platform 305, it may be understood that components of the data management platform 305 may be located in different locations.

In some examples, the operations illustrated in the process flow 300 may be performed by hardware (e.g., including circuitry, processing blocks, logic components, and other components), code (e.g., software or firmware) executed by a processor, or any combination thereof. Alternative examples of the following may be implemented, where some steps are performed in a different order than described or are not performed at all. In some cases, steps may include additional features not mentioned below, or further steps may be added.

At 315, the data management platform 305 may obtain, for a set of databases that comprises a primary database and a plurality of standby databases configured to be synchronized with the primary database, role information that indicates a first database as the primary database, one or more second databases as standby databases of a first type, and one or more third databases as standby databases of a second type. In some examples, the standby databases of the first type may include physical standby databases and the standby databases of the second type may include logical standby databases, snapshot standby databases, far sync standby databases, or any combination thereof. The set of databases may be located in two or more geographically distributed locations.

At 320, the data management platform 305 may identify, based on the role information for the set of databases, a data backup group that includes a subset of the databases. In some examples, the first database is included in the data backup group based on being the primary database, the one or more second databases are included in the data backup group based on being standby databases of the first type, and the one or more third databases are excluded from the data backup group based on being standby databases of the second type.

At 325, the data management platform 305 may identify a change in the role information for the set of databases. In some examples, the change in the role information indicates that a role for at least one database of the one or more third databases has changed from standby database of the second type to standby database of the first type.

At 330, the data management platform 305 may identify an updated data backup group based on the change in the role information for the set of databases. In some examples, the at least one database of the one or more third databases is included in the updated data backup group based on being standby database of the first type. At 335, the data management platform 305 may store a log backup for the database within the data backup group.

At 340, the data management platform 305 may perform a backup procedure for the set of databases based on generating a snapshot of a database within the data backup group. In some examples, the backup procedure may include a backup of datafiles and log files of the database within the data backup group. The snapshot may include a full snapshot or an incremental snapshot. In some examples, a single snapshot of a single database is generated as part of the backup procedure for the set of databases, the single snapshot including the snapshot of the database.

At 345, the data management platform 305 may determine a conclusion of the backup procedure for the set of databases based on generating the snapshot of the database within the data backup group. The data management platform 305 may then delete one or more archived logs for the subset of databases included in the data backup group based on determining the conclusion of the backup procedure.

Figure 4:
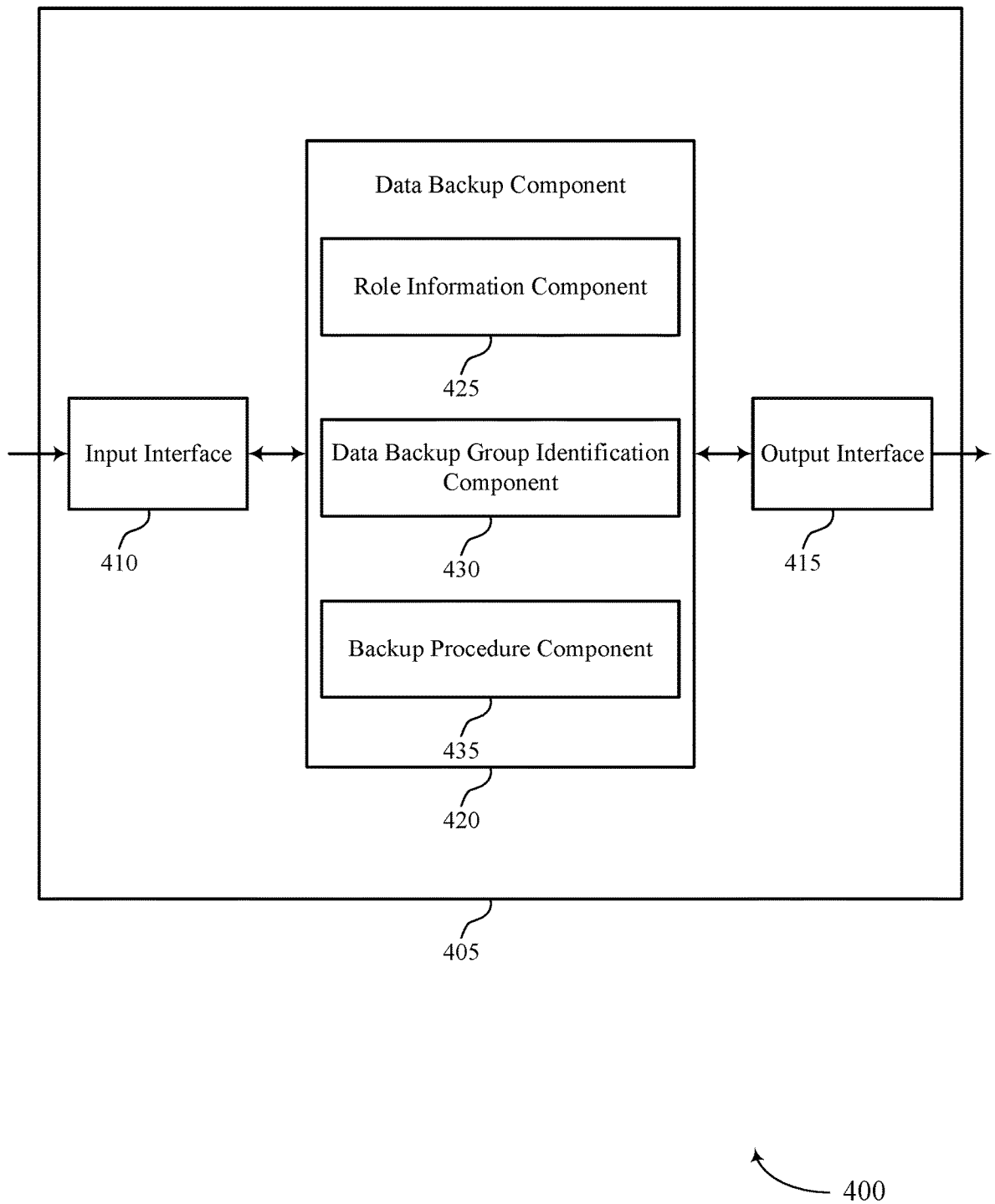
FIG. 4 shows a block diagram of a system that supports backup management for synchronized databases in accordance with aspects of the present disclosure.

FIG. 4 shows a block diagram 400 of a system 405 that supports backup management for synchronized databases in accordance with aspects of the present disclosure. In some examples, the system 405 may be an example of aspects of one or more components described with reference to FIG. 1, such as a DMS 110. The system 405 may include an input interface 410, an output interface 415, and a data backup component 420. The system 405 may also include one or more processors. Each of these components may be in communication with one another (e.g., via one or more buses, communications links, communications interfaces, or any combination thereof).

The input interface 410 may manage input signaling for the system 405. For example, the input interface 410 may receive input signaling (e.g., messages, packets, data, instructions, commands, or any other form of encoded information) from other systems or devices. The input interface 410 may send signaling corresponding to (e.g., representative of or otherwise based on) such input signaling to other components of the system 405 for processing. For example, the input interface 410 may transmit such corresponding signaling to the data backup component 420 to support backup management for synchronized databases. In some cases, the input interface 410 may be a component of a network interface 515 as described with reference to FIG. 5.

The output interface 815 may manage output signaling for the system 805. For example, the output interface 815 may receive signaling from other components of the system 805, such as the data backup component 820, and may transmit such output signaling corresponding to (e.g., representative of or otherwise based on) such signaling to other systems or devices. In some cases, the output interface 815 may be a component of a network interface 1015 as described with reference to FIG. 10.

For example, the data backup component 420 may include a role information component 425, a data backup group identification component 430, a backup procedure component 435, or any combination thereof. In some examples, the data backup component 420, or various components thereof, may be configured to perform various operations (e.g., receiving, monitoring, transmitting) using or otherwise in cooperation with the input interface 810, the output interface 815, or both. For example, the data backup component 820 may receive information from the input interface 810, send information to the output interface 815, or be integrated in combination with the input interface 810, the output interface 815, or both to receive information, transmit information, or perform various other operations as described herein.

The data backup component 420 may support data backup in accordance with examples as disclosed herein. The role information component 425 may be configured as or otherwise support a means for obtaining, for a set of databases that includes a primary database and a set of multiple standby databases configured to be synchronized with the primary database, role information that indicates a first database as the primary database, one or more second databases as standby databases of a first type, and one or more third databases as standby databases of a second type. The data backup group identification component 430 may be configured as or otherwise support a means for identifying, based on the role information for the set of databases, a data backup group that includes a subset of the databases, where the first database is included in the data backup group based on being the primary database, the one or more second databases are included in the data backup group based on being standby databases of the first type, and the one or more third databases are excluded from the data backup group based on being standby databases of the second type. The backup procedure component 435 may be configured as or otherwise support a means for performing a backup procedure for the set of databases based on generating a snapshot of a database within the data backup group.

Figure 5:
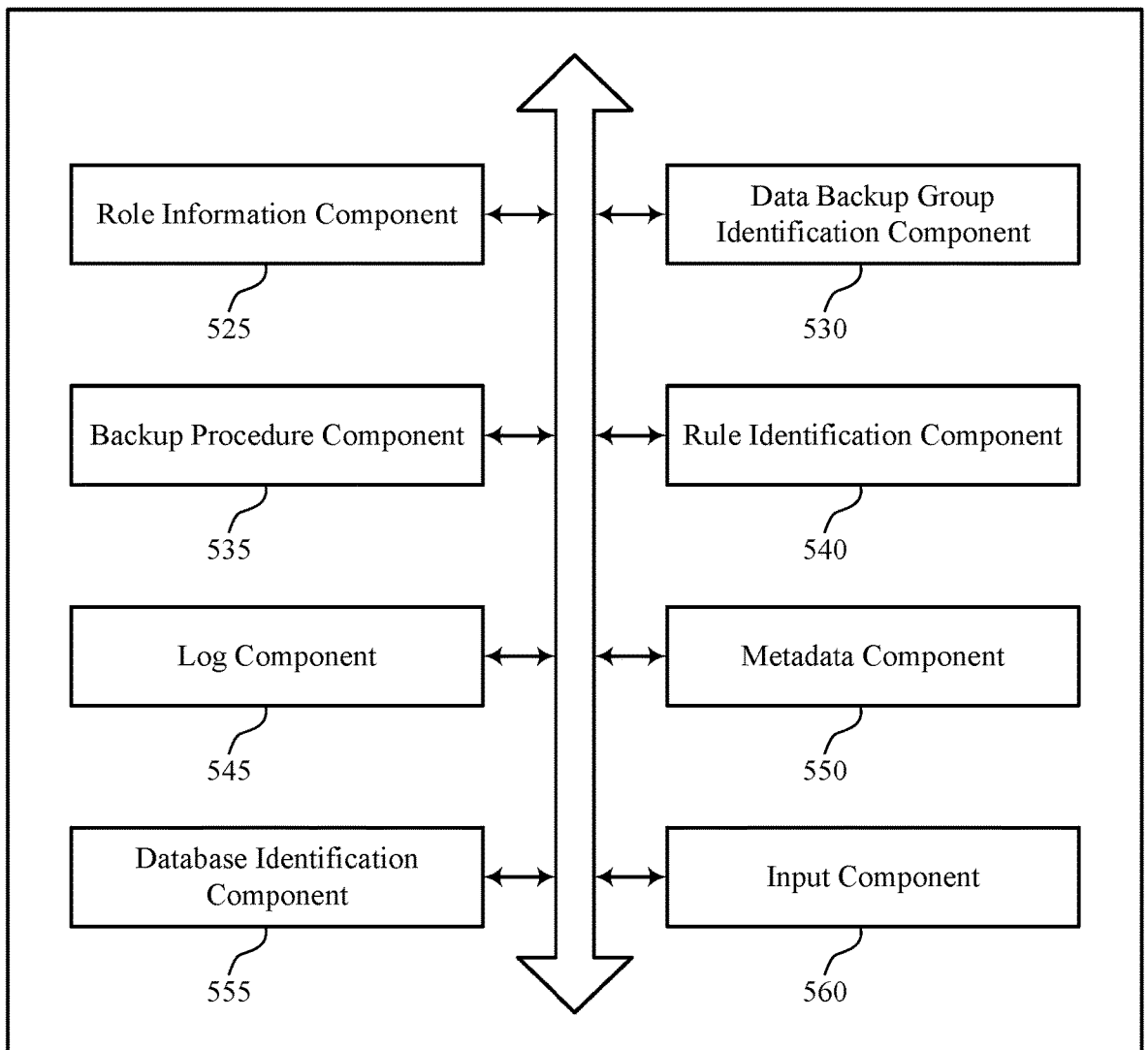
FIG. 5 shows a block diagram of a data backup component that supports backup management for synchronized databases in accordance with aspects of the present disclosure.

FIG. 5 shows a block diagram 500 of a data backup component 520 that supports backup management for synchronized databases in accordance with aspects of the present disclosure. The data backup component 520 may be an example of aspects of a data backup component 420 as described herein. The data backup component 520, or various components thereof, may be an example of means for performing various aspects of backup management for synchronized databases as described herein. For example, the data backup component 520 may include a role information component 525, a data backup group identification component 530, a backup procedure component 535, a rule identification component 540, a log component 545, a metadata component 550, a database identification component 555, an input component 560, or any combination thereof. Each of these components may communicate, directly or indirectly, with one another (e.g., via one or more buses, communications links, communications interfaces, or any combination thereof).

The data backup component 520 may support data backup in accordance with examples as disclosed herein. The role information component 525 may be configured as or otherwise support a means for obtaining, for a set of databases that includes a primary database and a set of multiple standby databases configured to be synchronized with the primary database, role information that indicates a first database as the primary database, one or more second databases as standby databases of a first type, and one or more third databases as standby databases of a second type. The data backup group identification component 530 may be configured as or otherwise support a means for identifying, based on the role information for the set of databases, a data backup group that includes a subset of the databases, where the first database is included in the data backup group based on being the primary database, the one or more second databases are included in the data backup group based on being standby databases of the first type, and the one or more third databases are excluded from the data backup group based on being standby databases of the second type. The backup procedure component 535 may be configured as or otherwise support a means for performing a backup procedure for the set of databases based on generating a snapshot of a database within the data backup group.

In some examples, the role information component 525 may be configured as or otherwise support a means for identifying a change in the role information for the set of databases, where the change in the role information indicates that a role for at least one database of the one or more third databases has changed from standby database of the second type to standby database of the first type. In some examples, the data backup group identification component 530 may be configured as or otherwise support a means for identifying an updated data backup group based on the change in the role information for the set of databases, where the at least one database of the one or more third databases is included in the updated data backup group based on being standby database of the first type.

In some examples, the rule identification component 540 may be configured as or otherwise support a means for identifying one or more rules for selecting the database within the data backup group for the backup procedure. In some examples, the database identification component 555 may be configured as or otherwise support a means for selecting the database for the backup procedure based at least in part on the one or more rules, wherein the snapshot of the database is generated (e.g., as part of the backup procedure for the set of databases) based at least in part on the database being selected for the backup procedure.

In some examples, the role information component 525 may be configured as or otherwise support a means for identifying a change in the role information for the set of databases. In some examples, the database identification component 555 may be configured as or otherwise support a means for selecting, based on the one or more rules and the change in the role information for the set of databases, a second database within the data backup group for generating a second snapshot as part of a second backup procedure for the set of databases. In some examples, the backup procedure component 535 may be configured as or otherwise support a means for performing the second backup procedure for the set of databases based on generating the second snapshot of the second database.

In some examples, the input component 560 may be configured as or otherwise support a means for receiving, from a user device, an input indicating the one or more rules for selecting the database within the data backup group for the backup procedure. In some examples, the one or more rules indicate that the backup procedure for the set of databases includes generating a snapshot of the primary database.

In some examples, the one or more rules indicate that the backup procedure for the set of databases includes generating a snapshot of the first database irrespective of the role information for the first database.

In some examples, the backup procedure component 535 may be configured as or otherwise support a means for determining a conclusion of the backup procedure for the set of databases based on generating the snapshot of the database within the data backup group. In some examples, the backup procedure component 535 may be configured as or otherwise support a means for deleting one or more archived logs for the subset of databases included in the data backup group based on determining the conclusion of the backup procedure.

In some examples, the log component 545 may be configured as or otherwise support a means for storing a log backup for the database within the data backup group. In some examples, the role information component 525 may be configured as or otherwise support a means for identifying a change in the role information for the set of databases. In some examples, the backup procedure component 535 may be configured as or otherwise support a means for generating a second snapshot of a second database within the data backup group based on the change in the role information, where the second snapshot is an incremental snapshot based on continuing to store the log backup for the database.

In some examples, the log component 545 may be configured as or otherwise support a means for generating a second log backup for the second database, where the log backup for the database is for a first set of transactions and the second log backup for the second database is for a second set of transactions that are subsequent to the first set of transactions.

In some examples, the metadata component 550 may be configured as or otherwise support a means for storing metadata associated with the database based on performing the backup procedure for the set of databases. In some examples, the set of databases are located in two or more geographically distributed locations.

In some examples, the backup procedure includes a backup of datafiles and log files of the database within the data backup group. In some examples, the snapshot includes a full snapshot or an incremental snapshot.

In some examples, the standby databases of the first type include physical standby databases and the standby databases of the second type include logical standby databases, snapshot standby databases, far sync standby databases, or any combination thereof. In some examples, a single snapshot of a single database is generated as part of the backup procedure for the set of databases, the single snapshot including the snapshot of the database.

Figure 6:
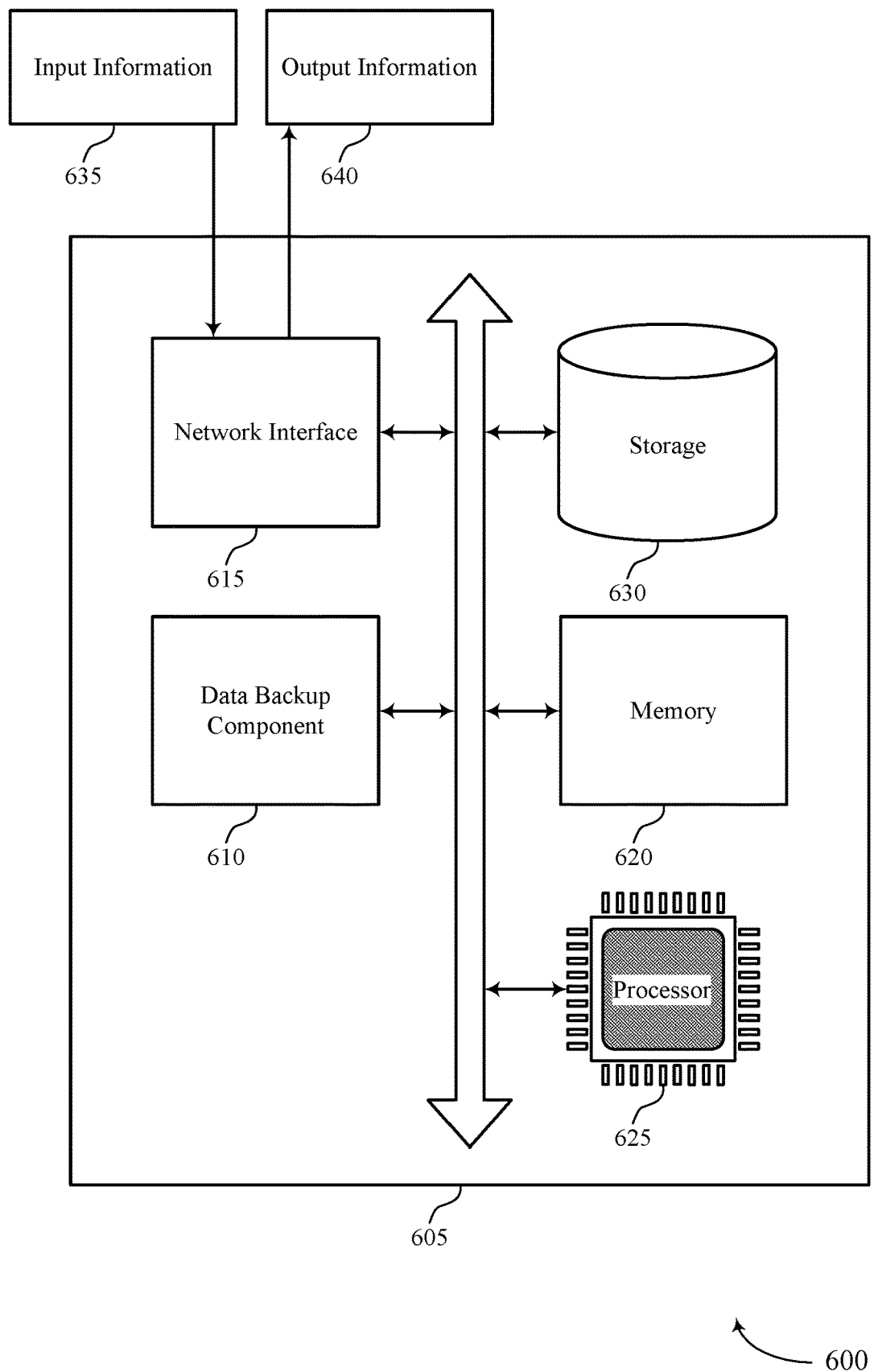
FIG. 6 shows a diagram of a system including a device that supports backup management for synchronized databases in accordance with aspects of the present disclosure.

FIG. 6 shows a diagram of a system 605 that supports backup management for synchronized databases in accordance with aspects of the present disclosure. The system 605 may be an example of or include aspects of a system 405 as described herein. The system 605 may include components for data management, including components such as a data backup component 610, a network interface 615, memory 620, processor 625, and storage 630. These components may be in electronic communication or otherwise coupled with each other (e.g., operatively, communicatively, functionally, electronically, electrically; via one or more buses, communications links, communications interfaces, or any combination thereof). Additionally, the components of the system 605 may comprise corresponding physical components or may be implemented as corresponding virtual components (e.g., components of one or more virtual machines). In some examples, the system 605 may be an example of aspects of one or more components described with reference to FIG. 1, such as a DMS 110.

The network interface 615 may enable the system 605 to exchange information (e.g., input information 635, output information 640, or both) with other systems or devices (not shown). For example, the network interface 615 may enable the system 605 to connect to a network (e.g., a network 120 as described herein). The network interface 615 may include one or more wireless network interfaces, one or more wired network interfaces, or any combination thereof. In some examples, the network interface 615 may be an example of may be an example of aspects of one or more components described with reference to FIG. 1, such as one or more network interfaces 165.

Memory 620 may include RAM, ROM, or both. The memory 620 may store computer-readable, computer-executable software including instructions that, when executed, cause the processor 625 to perform various functions described herein. In some cases, the memory 620 may contain, among other things, a basic input/output system (BIOS), which may control basic hardware or software operation such as the interaction with peripheral components or devices. In some cases, the memory 620 may be an example of aspects of one or more components described with reference to FIG. 1, such as one or more memories 175.

The processor 625 may include an intelligent hardware device, (e.g., a general-purpose processor, a digital signal processor (DSP), a CPU, a microcontroller, an application-specific integrated circuit (ASIC), a field programmable gate array (FPGA), a programmable logic device, a discrete gate or transistor logic component, a discrete hardware component, or any combination thereof). The processor 625 may be configured to execute computer-readable instructions stored in a memory 620 to perform various functions (e.g., functions or tasks supporting backup management for synchronized databases). Though a single processor 625 is depicted in the example of FIG. 6, it is to be understood that the system 605 may include any quantity of one or more processors 625 and that a group of processors 625 may collectively perform one or more functions ascribed herein to a processor, such as the processor 625. In some cases, the processor 625 may be an example of aspects of one or more components described with reference to FIG. 1, such as one or more processors 170.

Storage 630 may be configured to store data that is generated, processed, stored, or otherwise used by the system 605. In some cases, the storage 630 may include one or more HDDs, one or more SDDs, or both. In some examples, the storage 630 may be an example of a single database, a distributed database, multiple distributed databases, a data store, a data lake, or an emergency backup database. In some examples, the storage 630 may be an example of one or more components described with reference to FIG. 1, such as one or more network disks 180.

The data backup component 610 may support data backup in accordance with examples as disclosed herein. For example, the data backup component 610 may be configured as or otherwise support a means for obtaining, for a set of databases that includes a primary database and a set of multiple standby databases configured to be synchronized with the primary database, role information that indicates a first database as the primary database, one or more second databases as standby databases of a first type, and one or more third databases as standby databases of a second type. The data backup component 610 may be configured as or otherwise support a means for identifying, based on the role information for the set of databases, a data backup group that includes a subset of the databases, where the first database is included in the data backup group based on being the primary database, the one or more second databases are included in the data backup group based on being standby databases of the first type, and the one or more third databases are excluded from the data backup group based on being standby databases of the second type. The data backup component 610 may be configured as or otherwise support a means for performing a backup procedure for the set of databases based on generating a snapshot of a database within the data backup group.

Figure 7:
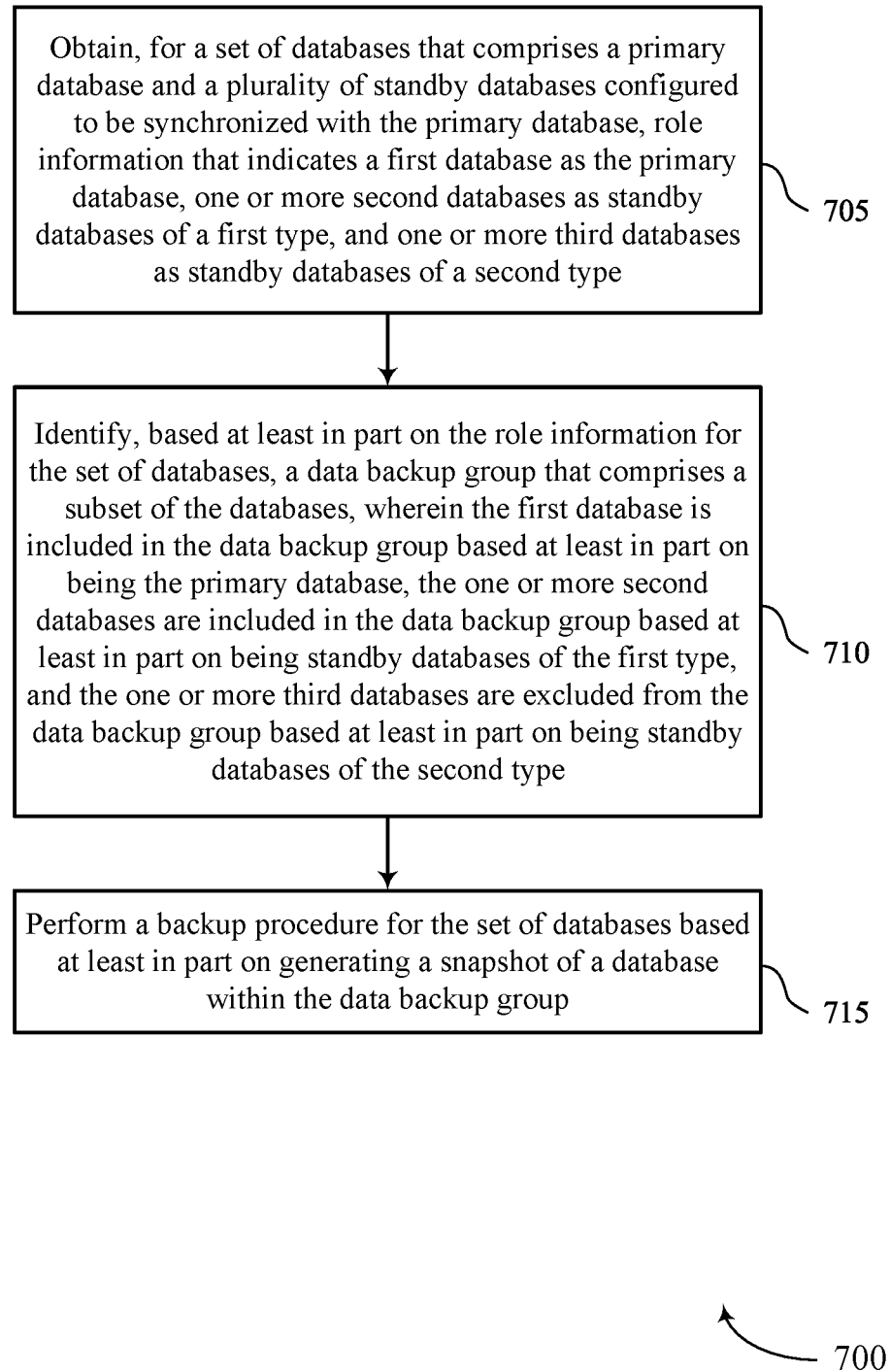
FIGS. 7 through 10 show flowcharts illustrating methods that support backup management for synchronized databases in accordance with aspects of the present disclosure.

FIG. 7 shows a flowchart illustrating a method 700 that supports backup management for synchronized databases in accordance with aspects of the present disclosure. The operations of the method 700 may be implemented by a system or its components as described herein. For example, the operations of the method 700 may be performed by a DMS as described with reference to FIGS. 1 through 6. In some examples, a DMS may execute a set of instructions to control the functional elements of the DMS to perform the described functions. Additionally, or alternatively, the DMS may perform aspects of the described functions using special-purpose hardware.

At 705, the method may include obtaining, for a set of databases that includes a primary database and a set of multiple standby databases configured to be synchronized with the primary database, role information that indicates a first database as the primary database, one or more second databases as standby databases of a first type, and one or more third databases as standby databases of a second type. The operations of 705 may be performed in accordance with examples as disclosed herein. In some examples, aspects of the operations of 705 may be performed by a role information component 525 as described with reference to FIG. 5.

At 710, the method may include identifying, based on the role information for the set of databases, a data backup group that includes a subset of the databases, where the first database is included in the data backup group based on being the primary database, the one or more second databases are included in the data backup group based on being standby databases of the first type, and the one or more third databases are excluded from the data backup group based on being standby databases of the second type. The operations of 710 may be performed in accordance with examples as disclosed herein. In some examples, aspects of the operations of 710 may be performed by a data backup group identification component 530 as described with reference to FIG. 5.

At 715, the method may include performing a backup procedure for the set of databases based on generating a snapshot of a database within the data backup group. The operations of 715 may be performed in accordance with examples as disclosed herein. In some examples, aspects of the operations of 715 may be performed by a backup procedure component 535 as described with reference to FIG. 5.

Figure 8:
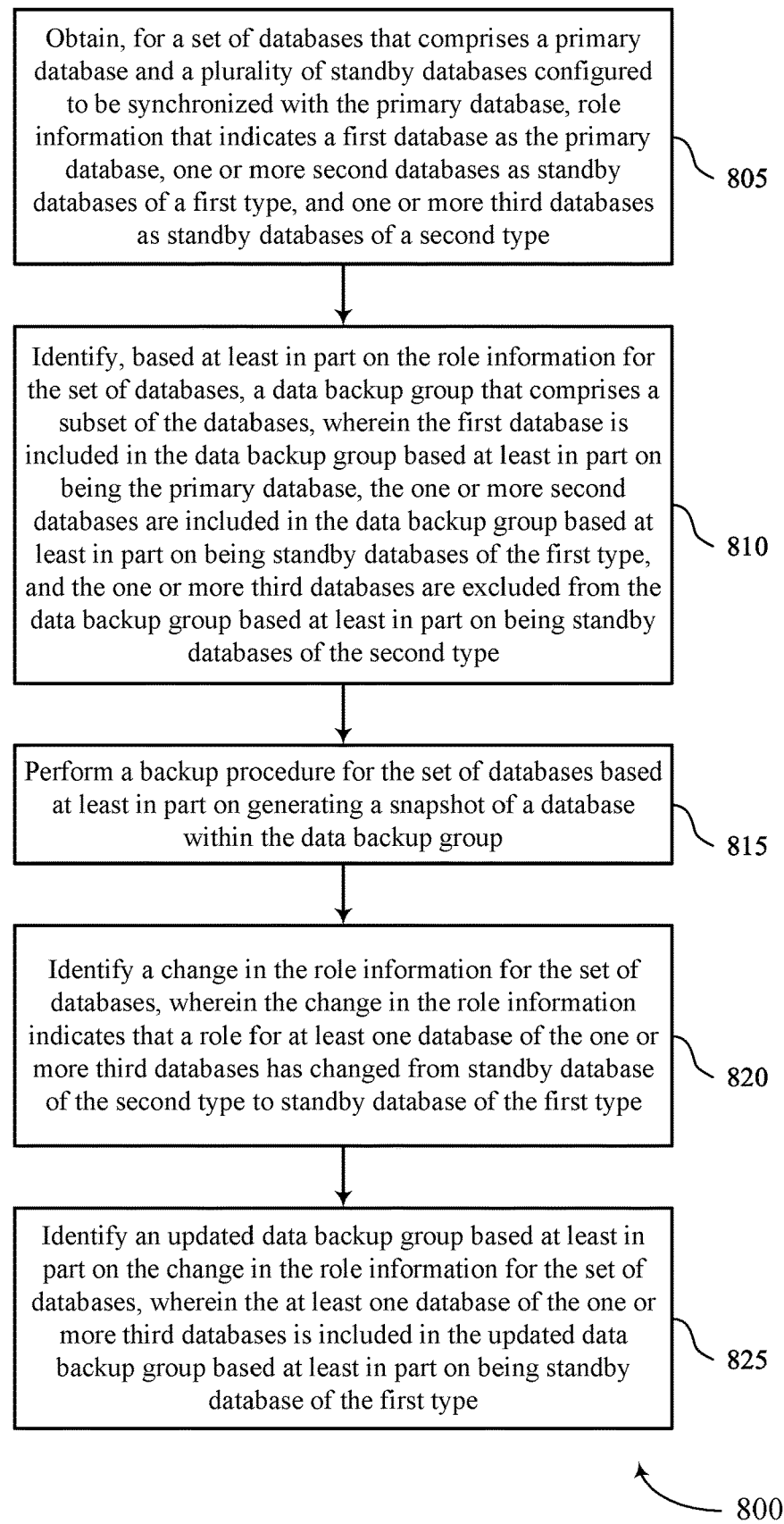

FIG. 8 shows a flowchart illustrating a method 800 that supports backup management for synchronized databases in accordance with aspects of the present disclosure. The operations of the method 800 may be implemented by a system or its components as described herein. For example, the operations of the method 800 may be performed by a DMS as described with reference to FIGS. 1 through 6. In some examples, a DMS may execute a set of instructions to control the functional elements of the DMS to perform the described functions. Additionally, or alternatively, the DMS may perform aspects of the described functions using special-purpose hardware.

At 805, the method may include obtaining, for a set of databases that includes a primary database and a set of multiple standby databases configured to be synchronized with the primary database, role information that indicates a first database as the primary database, one or more second databases as standby databases of a first type, and one or more third databases as standby databases of a second type. The operations of 805 may be performed in accordance with examples as disclosed herein. In some examples, aspects of the operations of 805 may be performed by a role information component 525 as described with reference to FIG. 5.

At 810, the method may include identifying, based on the role information for the set of databases, a data backup group that includes a subset of the databases, where the first database is included in the data backup group based on being the primary database, the one or more second databases are included in the data backup group based on being standby databases of the first type, and the one or more third databases are excluded from the data backup group based on being standby databases of the second type. The operations of 810 may be performed in accordance with examples as disclosed herein. In some examples, aspects of the operations of 810 may be performed by a data backup group identification component 530 as described with reference to FIG. 5.

At 815, the method may include performing a backup procedure for the set of databases based on generating a snapshot of a database within the data backup group. The operations of 815 may be performed in accordance with examples as disclosed herein. In some examples, aspects of the operations of 815 may be performed by a backup procedure component 535 as described with reference to FIG. 5.

At 820, the method may include identifying a change in the role information for the set of databases, where the change in the role information indicates that a role for at least one database of the one or more third databases has changed from standby database of the second type to standby database of the first type. The operations of 820 may be performed in accordance with examples as disclosed herein. In some examples, aspects of the operations of 820 may be performed by a role information component 525 as described with reference to FIG. 5.

At 825, the method may include identifying an updated data backup group based on the change in the role information for the set of databases, where the at least one database of the one or more third databases is included in the updated data backup group based on being standby database of the first type. The operations of 825 may be performed in accordance with examples as disclosed herein. In some examples, aspects of the operations of 825 may be performed by a data backup group identification component 530 as described with reference to FIG. 5.

Figure 9:
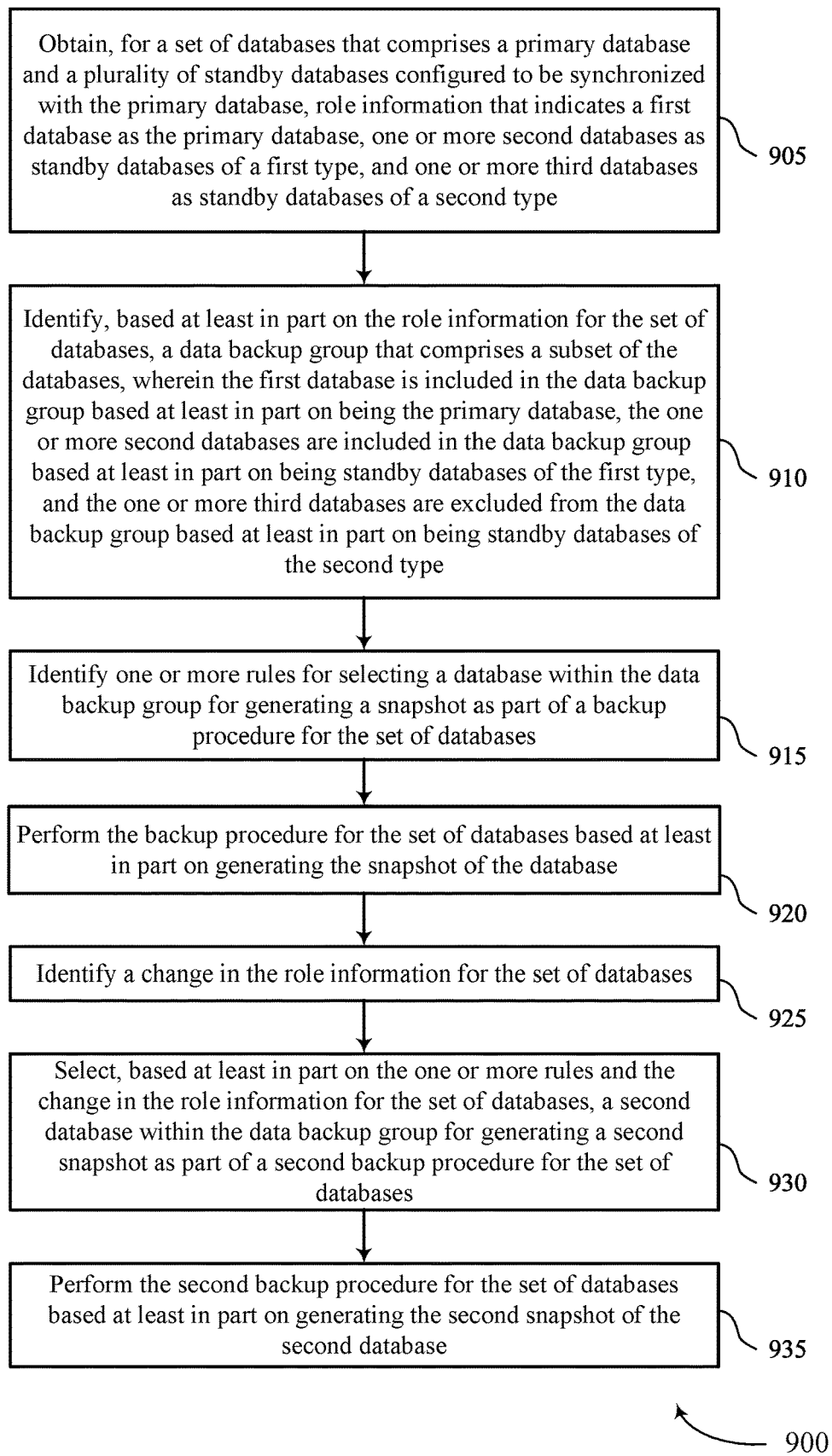

FIG. 9 shows a flowchart illustrating a method 900 that supports backup management for synchronized databases in accordance with aspects of the present disclosure. The operations of the method 900 may be implemented by a system or its components as described herein. For example, the operations of the method 900 may be performed by a DMS as described with reference to FIGS. 1 through 6. In some examples, a DMS may execute a set of instructions to control the functional elements of the DMS to perform the described functions. Additionally, or alternatively, the DMS may perform aspects of the described functions using special-purpose hardware.

At 905, the method may include obtaining, for a set of databases that includes a primary database and a set of multiple standby databases configured to be synchronized with the primary database, role information that indicates a first database as the primary database, one or more second databases as standby databases of a first type, and one or more third databases as standby databases of a second type. The operations of 905 may be performed in accordance with examples as disclosed herein. In some examples, aspects of the operations of 905 may be performed by a role information component 525 as described with reference to FIG. 5.

At 910, the method may include identifying, based on the role information for the set of databases, a data backup group that includes a subset of the databases, where the first database is included in the data backup group based on being the primary database, the one or more second databases are included in the data backup group based on being standby databases of the first type, and the one or more third databases are excluded from the data backup group based on being standby databases of the second type. The operations of 910 may be performed in accordance with examples as disclosed herein. In some examples, aspects of the operations of 910 may be performed by a data backup group identification component 530 as described with reference to FIG. 5.

At 915, the method may include identifying one or more rules for selecting a database within the data backup group for generating a snapshot as part of a backup procedure for the set of databases. The operations of 915 may be performed in accordance with examples as disclosed herein. In some examples, aspects of the operations of 915 may be performed by a rule identification component 540 as described with reference to FIG. 5.

At 920, the method may include performing the backup procedure for the set of databases based on generating the snapshot of the database. The operations of 920 may be performed in accordance with examples as disclosed herein. In some examples, aspects of the operations of 920 may be performed by a backup procedure component 535 as described with reference to FIG. 5.

At 925, the method may include identifying a change in the role information for the set of databases. The operations of 925 may be performed in accordance with examples as disclosed herein. In some examples, aspects of the operations of 925 may be performed by a role information component 525 as described with reference to FIG. 5.

At 930, the method may include selecting, based on the one or more rules and the change in the role information for the set of databases, a second database within the data backup group for generating a second snapshot as part of a second backup procedure for the set of databases. The operations of 930 may be performed in accordance with examples as disclosed herein. In some examples, aspects of the operations of 930 may be performed by a database identification component 555 as described with reference to FIG. 5.

At 935, the method may include performing the second backup procedure for the set of databases based on generating the second snapshot of the second database within the data backup group. The operations of 935 may be performed in accordance with examples as disclosed herein. In some examples, aspects of the operations of 935 may be performed by a backup procedure component 535 as described with reference to FIG. 5.

Figure 10:
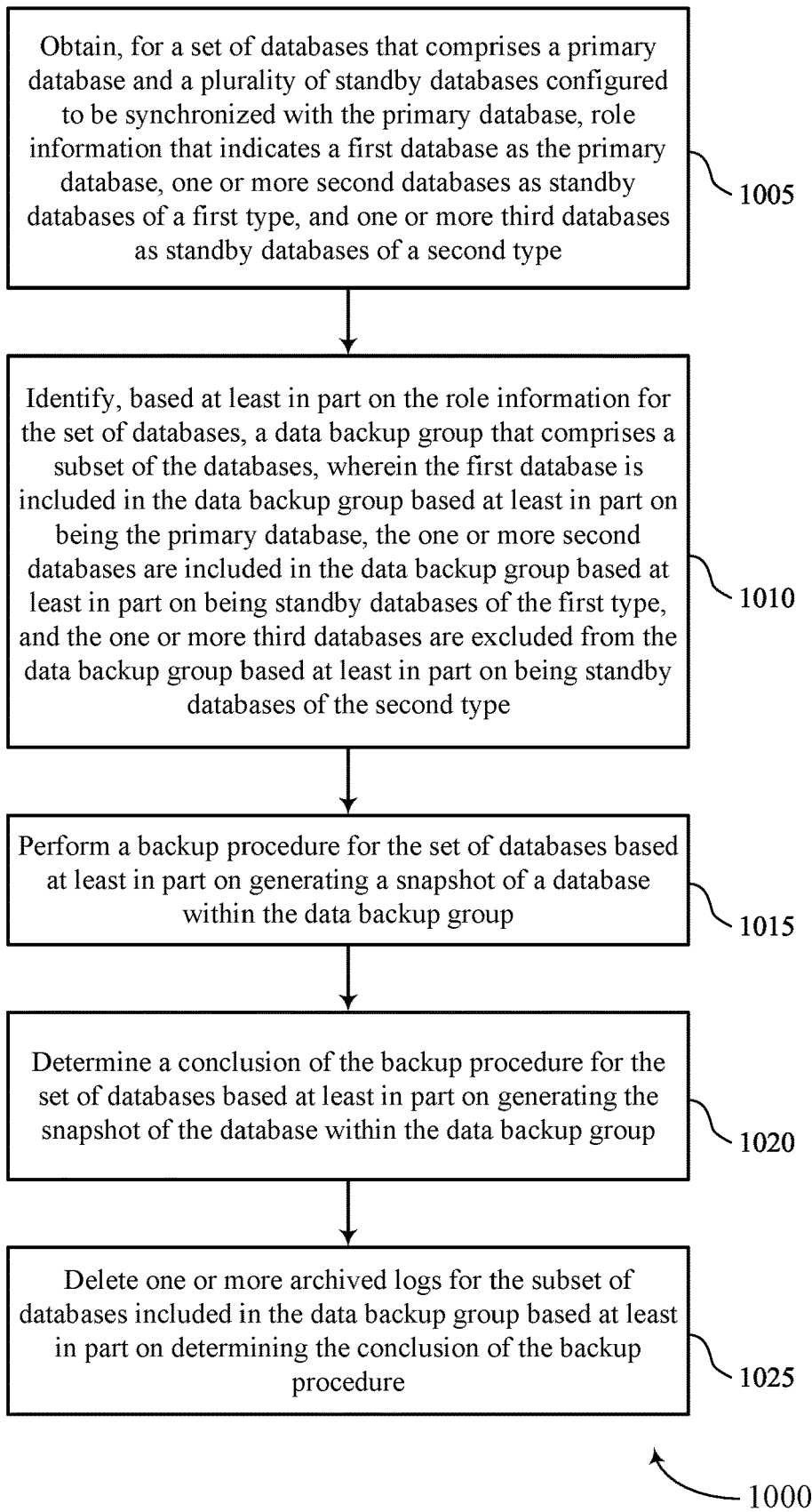

FIG. 10 shows a flowchart illustrating a method 1000 that supports backup management for synchronized databases in accordance with aspects of the present disclosure. The operations of the method 1000 may be implemented by a system or its components as described herein. For example, the operations of the method 1000 may be performed by a DMS as described with reference to FIGS. 1 through 6. In some examples, a DMS may execute a set of instructions to control the functional elements of the DMS to perform the described functions. Additionally, or alternatively, the DMS may perform aspects of the described functions using special-purpose hardware.

At 1005, the method may include obtaining, for a set of databases that includes a primary database and a set of multiple standby databases configured to be synchronized with the primary database, role information that indicates a first database as the primary database, one or more second databases as standby databases of a first type, and one or more third databases as standby databases of a second type. The operations of 1005 may be performed in accordance with examples as disclosed herein. In some examples, aspects of the operations of 1005 may be performed by a role information component 525 as described with reference to FIG. 5.

At 1010, the method may include identifying, based on the role information for the set of databases, a data backup group that includes a subset of the databases, where the first database is included in the data backup group based on being the primary database, the one or more second databases are included in the data backup group based on being standby databases of the first type, and the one or more third databases are excluded from the data backup group based on being standby databases of the second type. The operations of 1010 may be performed in accordance with examples as disclosed herein. In some examples, aspects of the operations of 1010 may be performed by a data backup group identification component 530 as described with reference to FIG. 5.

At 1015, the method may include performing a backup procedure for the set of databases based on generating a snapshot of a database within the data backup group. The operations of 1015 may be performed in accordance with examples as disclosed herein. In some examples, aspects of the operations of 1015 may be performed by a backup procedure component 535 as described with reference to FIG. 5.

At 1020, the method may include determining a conclusion of the backup procedure for the set of databases based on generating the snapshot of the database within the data backup group. The operations of 1020 may be performed in accordance with examples as disclosed herein. In some examples, aspects of the operations of 1020 may be performed by a backup procedure component 535 as described with reference to FIG. 5.

At 1025, the method may include deleting one or more archived logs for the subset of databases included in the data backup group based on determining the conclusion of the backup procedure. The operations of 1025 may be performed in accordance with examples as disclosed herein. In some examples, aspects of the operations of 1025 may be performed by a backup procedure component 535 as described with reference to FIG. 5.

A method for data backup is described. The method may include obtaining, for a set of databases that includes a primary database and a set of multiple standby databases configured to be synchronized with the primary database, role information that indicates a first database as the primary database, one or more second databases as standby databases of a first type, and one or more third databases as standby databases of a second type, identifying, based on the role information for the set of databases, a data backup group that includes a subset of the databases, where the first database is included in the data backup group based on being the primary database, the one or more second databases are included in the data backup group based on being standby databases of the first type, and the one or more third databases are excluded from the data backup group based on being standby databases of the second type, and performing a backup procedure for the set of databases based on generating a snapshot of a database within the data backup group.

An apparatus for data backup is described. The apparatus may include at least one processor, memory coupled with the processor, and instructions stored in the memory. The instructions may be executable by the at least one processor to cause the apparatus to obtain, for a set of databases that includes a primary database and a set of multiple standby databases configured to be synchronized with the primary database, role information that indicates a first database as the primary database, one or more second databases as standby databases of a first type, and one or more third databases as standby databases of a second type, identify, based on the role information for the set of databases, a data backup group that includes a subset of the databases, where the first database is included in the data backup group based on being the primary database, the one or more second databases are included in the data backup group based on being standby databases of the first type, and the one or more third databases are excluded from the data backup group based on being standby databases of the second type, and perform a backup procedure for the set of databases based on generating a snapshot of a database within the data backup group.

Another apparatus for data backup is described. The apparatus may include means for obtaining, for a set of databases that includes a primary database and a set of multiple standby databases configured to be synchronized with the primary database, role information that indicates a first database as the primary database, one or more second databases as standby databases of a first type, and one or more third databases as standby databases of a second type, means for identifying, based on the role information for the set of databases, a data backup group that includes a subset of the databases, where the first database is included in the data backup group based on being the primary database, the one or more second databases are included in the data backup group based on being standby databases of the first type, and the one or more third databases are excluded from the data backup group based on being standby databases of the second type, and means for performing a backup procedure for the set of databases based on generating a snapshot of a database within the data backup group.

A non-transitory computer-readable medium storing code for data backup is described. The code may include instructions executable by at least one processor to obtain, for a set of databases that includes a primary database and a set of multiple standby databases configured to be synchronized with the primary database, role information that indicates a first database as the primary database, one or more second databases as standby databases of a first type, and one or more third databases as standby databases of a second type, identify, based on the role information for the set of databases, a data backup group that includes a subset of the databases, where the first database is included in the data backup group based on being the primary database, the one or more second databases are included in the data backup group based on being standby databases of the first type, and the one or more third databases are excluded from the data backup group based on being standby databases of the second type, and perform a backup procedure for the set of databases based on generating a snapshot of a database within the data backup group.

Some examples of the method, apparatuses, and non-transitory computer-readable medium described herein may further include operations, features, means, or instructions for identifying a change in the role information for the set of databases, where the change in the role information indicates that a role for at least one database of the one or more third databases may have changed from standby database of the second type to standby database of the first type and identifying an updated data backup group based on the change in the role information for the set of databases, where the at least one database of the one or more third databases may be included in the updated data backup group based on being standby database of the first type.

Some examples of the method, apparatuses, and non-transitory computer-readable medium described herein may further include operations, features, means, or instructions for identifying one or more rules for selecting the database within the data backup group for the backup procedure, and selecting the database for the backup procedure based at least in part on the one or more rules, where the snapshot of the database is generated based at least in part on the database being selected for the backup procedure.

Some examples of the method, apparatuses, and non-transitory computer-readable medium described herein may further include operations, features, means, or instructions for identifying a change in the role information for the set of databases, selecting, based on the one or more rules and the change in the role information for the set of databases, a second database within the data backup group for generating a second snapshot as part of a second backup procedure for the set of databases, and performing the second backup procedure for the set of databases based on generating the second snapshot of the second database.

Some examples of the method, apparatuses, and non-transitory computer-readable medium described herein may further include operations, features, means, or instructions for receiving, from a user device, an input indicating the one or more rules for selecting the database within the data backup group for the backup procedure.

In some examples of the method, apparatuses, and non-transitory computer-readable medium described herein, the one or more rules indicate that the backup procedure for the set of databases includes generating a snapshot of the primary database.

In some examples of the method, apparatuses, and non-transitory computer-readable medium described herein, the one or more rules indicate that the backup procedure for the set of databases includes generating a snapshot of the first database irrespective of the role information for the first database.

Some examples of the method, apparatuses, and non-transitory computer-readable medium described herein may further include operations, features, means, or instructions for determining a conclusion of the backup procedure for the set of databases based on generating the snapshot of the database within the data backup group and deleting one or more archived logs for the subset of databases included in the data backup group based on determining the conclusion of the backup procedure.

Some examples of the method, apparatuses, and non-transitory computer-readable medium described herein may further include operations, features, means, or instructions for storing a log backup for the database within the data backup group, identifying a change in the role information for the set of databases, and generating a second snapshot of a second database within the data backup group based on the change in the role information, where the second snapshot may be an incremental snapshot based on continuing to store the log backup for the database.

Some examples of the method, apparatuses, and non-transitory computer-readable medium described herein may further include operations, features, means, or instructions for generating a second log backup for the second database, where the log backup for the database may be for a first set of transactions and the second log backup for the second database may be for a second set of transactions that may be subsequent to the first set of transactions.

Some examples of the method, apparatuses, and non-transitory computer-readable medium described herein may further include operations, features, means, or instructions for storing metadata associated with the database based on performing the backup procedure for the set of databases.

In some examples of the method, apparatuses, and non-transitory computer-readable medium described herein, the set of databases may be located in two or more geographically distributed locations. In some examples of the method, apparatuses, and non-transitory computer-readable medium described herein, the backup procedure includes a backup of datafiles and log files of the database within the data backup group.

In some examples of the method, apparatuses, and non-transitory computer-readable medium described herein, the snapshot includes a full snapshot or an incremental snapshot. In some examples of the method, apparatuses, and non-transitory computer-readable medium described herein, the standby databases of the first type include physical standby databases and the standby databases of the second type include logical standby databases, snapshot standby databases, far sync standby databases, or any combination thereof.

In some examples of the method, apparatuses, and non-transitory computer-readable medium described herein, a single snapshot of a single database may be generated as part of the backup procedure for the set of databases, the single snapshot including the snapshot of the database.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Further, a system as used herein may be a collection of devices, a single device, or aspects within a single device.

Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, EEPROM) compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method, comprising:
    obtaining, for a set of databases that comprises a primary database and a plurality of standby databases configured to be synchronized with the primary database, role information that indicates a first database as the primary database, one or more second databases as standby databases of a first type, and one or more third databases as standby databases of a second type;
    including a subset of databases from among the set of databases, based at least in part on the role information for the set of databases, in a data backup group, wherein the first database is included in the data backup group based at least in part on being the primary database, the one or more second databases are included in the data backup group based at least in part on being standby databases of the first type, and the one or more third databases are excluded from the data backup group based at least in part on being standby databases of the second type;
    selecting, based at least in part on one or more rules identifying a type of database for a backup procedure for the set of databases, a database from the subset of databases to perform the backup procedure for the set of databases; and
    generating a snapshot of the selected database to perform the backup procedure for the set of databases.

2. The method of claim 1, further comprising:
    identifying a change in the role information for the set of databases, wherein the change in the role information indicates that a role for at least one database of the one or more third databases has changed from standby database of the second type to standby database of the first type; and
    identifying an updated data backup group based at least in part on the change in the role information for the set of databases, wherein the at least one database of the one or more third databases is included in the updated data backup group based at least in part on being standby database of the first type.

3. The method of claim 1, further comprising:
    identifying a change in the role information for the set of databases;
    selecting, based at least in part on the one or more rules and the change in the role information for the set of databases, a second database within the data backup group for generating a second snapshot as part of a second backup procedure for the set of databases; and
    performing the second backup procedure for the set of databases based at least in part on generating the second snapshot of the second database.

4. The method of claim 1, further comprising:
    receiving, from a user device, an input indicating the one or more rules for selecting the database within the data backup group for the backup procedure.

5. The method of claim 1, wherein the one or more rules indicate that the backup procedure for the set of databases comprises generating a snapshot of the primary database.

6. The method of claim 1, wherein the one or more rules indicate that the backup procedure for the set of databases comprises generating a snapshot of the first database irrespective of the role information for the first database.

7. The method of claim 1, further comprising:
    determining a conclusion of the backup procedure for the set of databases based at least in part on generating the snapshot of the selected database within the data backup group; and deleting one or more archived logs for the subset of databases included in the data backup group based at least in part on determining the conclusion of the backup procedure.

8. The method of claim 1, further comprising:
storing a log backup for the selected database within the data backup group;
identifying a change in the role information for the set of databases; and
generating a second snapshot of a second database within the data backup group based at least in part on the change in the role information, wherein the second snapshot is an incremental snapshot based at least in part on continuing to store the log backup for the selected database.

9. The method of claim 8, further comprising:
generating a second log backup for the second database, wherein the log backup for the selected database is for a first set of transactions and the second log backup for the second database is for a second set of transactions that are subsequent to the first set of transactions.

10. The method of claim 1, further comprising:
storing metadata associated with the selected database based at least in part on performing the backup procedure for the set of databases.

11. The method of claim 1, wherein the set of databases are located in two or more geographically distributed locations.

12. The method of claim 1, wherein the backup procedure comprises a backup of datafiles and log files of the selected database within the data backup group.

13. The method of claim 1, wherein the standby databases of the first type comprise physical standby databases and the standby databases of the second type comprise logical standby databases, snapshot standby databases, far sync standby databases, or any combination thereof.

14. The method of claim 1, wherein a single snapshot of a single database is generated as part of the backup procedure for the set of databases, the single snapshot comprising the snapshot of the selected database.

15. An apparatus, comprising:
at least one processor;
memory coupled with the at least one processor; and
instructions stored in the memory and executable by the at least one processor to cause the apparatus to:
obtain, for a set of databases that comprises a primary database and a plurality of standby databases configured to be synchronized with the primary database, role information that indicates a first database as the primary database, one or more second databases as standby databases of a first type, and one or more third databases as standby databases of a second type;
include a subset of databases from among the set of databases, based at least in part on the role information for the set of databases, in a data backup group, wherein the first database is included in the data backup group based at least in part on being the primary database, the one or more second databases are included in the data backup group based at least in part on being standby databases of the first type, and the one or more third databases are excluded from the data backup group based at least in part on being standby databases of the second type;
select, based at least in part on one or more rules identifying a type of database for a backup procedure for the set of databases, a database from the subset of databases to perform the backup procedure for the set of databases; and
generate a snapshot of the selected database to perform the backup procedure for the set of databases.

16. The apparatus of claim 15, wherein the instructions are further executable by the at least one processor to cause the apparatus to:
identify a change in the role information for the set of databases, wherein the change in the role information indicates that a role for at least one database of the one or more third databases has changed from standby database of the second type to standby database of the first type; and
identify an updated data backup group based at least in part on the change in the role information for the set of databases, wherein the at least one database of the one or more third databases is included in the updated data backup group based at least in part on being standby database of the first type.

17. The apparatus of claim 15, wherein the instructions are further executable by the at least one processor to cause the apparatus to:
identify a change in the role information for the set of databases;
select, based at least in part on the one or more rules and the change in the role information for the set of databases, a second database within the data backup group for generating a second snapshot as part of a second backup procedure for the set of databases; and
perform the second backup procedure for the set of databases based at least in part on generating the second snapshot of the second database.

18. A non-transitory computer-readable medium storing code, the code comprising instructions executable by at least one processor to:
obtain, for a set of databases that comprises a primary database and a plurality of standby databases configured to be synchronized with the primary database, role information that indicates a first database as the primary database, one or more second databases as standby databases of a first type, and one or more third databases as standby databases of a second type;
include a subset of databases from among the set of databases, based at least in part on the role information for the set of databases, in a data backup group, wherein the first database is included in the data backup group based at least in part on being the primary database, the one or more second databases are included in the data backup group based at least in part on being standby databases of the first type, and the one or more third databases are excluded from the data backup group based at least in part on being standby databases of the second type;
select, based at least in part on one or more rules identifying a type of database for a backup procedure for the set of databases, a database from the subset of databases to perform the backup procedure for the set of databases; and
generate a snapshot of the selected database to perform the backup procedure for the set of databases.

* * * * *